United States Patent
Hiraguchi et al.

(10) Patent No.: US 6,874,631 B1
(45) Date of Patent: Apr. 5, 2005

(54) MAGNETIC TAPE CASSETTE STORAGE CASE

(75) Inventors: Kazuo Hiraguchi, Kanagawa (JP); Shozo Onmori, Kanagawa (JP); Kiyoo Morita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/980,712

(22) PCT Filed: Jun. 6, 2000

(86) PCT No.: PCT/JP00/03673

§ 371 (c)(1),
(2), (4) Date: Dec. 5, 2001

(87) PCT Pub. No.: WO00/75047

PCT Pub. Date: Dec. 14, 2000

(30) Foreign Application Priority Data

Jun. 7, 1999 (JP) .......................................... 11-159728

(51) Int. Cl.⁷ .............................................. B65D 85/57
(52) U.S. Cl. ................................. 206/387.13; 206/232
(58) Field of Search ............................. 206/232, 387.1, 206/387.12, 387.13, 472, 449, 308.1

(56) References Cited

U.S. PATENT DOCUMENTS

| 4,496,048 | A | * | 1/1985 | Sykes ..................... 206/387.13 |
| 4,643,301 | A | | 2/1987 | Hehn et al. |
| 5,415,291 | A | * | 5/1995 | Fukagawa ................. 206/308.3 |
| 5,443,159 | A | * | 8/1995 | Cheng ................... 206/387.13 |
| 5,458,236 | A | | 10/1995 | Schoettle et al. |
| 5,477,960 | A | * | 12/1995 | Chen ....................... 206/308.1 |
| 5,499,714 | A | * | 3/1996 | Konno ................... 206/387.13 |
| 5,597,068 | A | * | 1/1997 | Weisburn et al. ........ 206/308.1 |
| 5,645,165 | A | * | 7/1997 | Taniyama ................ 206/308.1 |
| 5,697,497 | A | * | 12/1997 | Mallery ................... 206/308.1 |
| 5,772,028 | A | * | 6/1998 | Marsilio et al. ......... 206/387.1 |
| 5,899,330 | A | * | 5/1999 | Sato et al. ............. 206/387.13 |
| 6,009,999 | A | * | 1/2000 | Morita et al. .......... 206/387.13 |

FOREIGN PATENT DOCUMENTS

| EP | 1 134 168 A1 | 9/2001 |
| GB | 1 573 884 | 8/1980 |
| GB | 2 162 826 A | 2/1986 |
| JP | 55-149872 | 10/1980 |
| JP | 09-169383 | 6/1997 |
| WO | WO00/11672 | 3/2000 |

* cited by examiner

Primary Examiner—Luan K. Bui
(74) Attorney, Agent, or Firm—Sughrue Mion, PLLC

(57) ABSTRACT

In the magnetic tape cassette storage case, on the neighboring portions of the connecting portions between the bottom plate (21) and inner walls (22) of a storage part (20), there are disposed ribs (24) in such a manner that they extend into the bottom plate (21) and inner walls (22) and project inwardly of the storage part (20). Due to this structure, between the back surface (11b) of a magnetic tape cassette (11) and the bottom plate (21) of the storage part (20), there can be defined a required clearance (S) capable of storing an information sheet (13) therein. Therefore, the present magnetic tape cassette storage case is capable of storing, together with the magnetic tape cassette, a large quantity of information sheets at a given position and in a given posture as well as with a good operation efficiency.

18 Claims, 19 Drawing Sheets

MAGNETIC TAPE CASSETTE STORAGE CASE

TECHNICAL FIELD

The present invention relates to a storage case for storing therein a magnetic tape cassette such as a digital videocassette to thereby protect the magnetic tape cassette.

BACKGROUND OF THE INVENTION

Recently, of broadcasting machinery and materials, as a TV camera designed exclusively for recording and collecting information, there has been used a compact digital video camera which is excellent in portability. Although it is small in size, the compact digital video camera is capable of providing high image quality through digital signal processing. For this reason, the compact digital video camera is often used as a business machine for a TV cameraman and for a TV information recording/collecting specialist.

As a digital videocassette (which is hereinafter referred to as a DVC) to loaded into and used in the above-mentioned compact digital video camera, there are available three kinds of digital videocassettes which are different in size, that is, different in the recording time from one another. The DVCs of three sizes are on sale in such a manner that they are respectively stored in their exclusive storage cases.

The DVC is often used for recording important materials in business; for example, it is used when the cameraman or specialist records materials on the scene; or, it is used when, after the cameraman or specialist records materials on the scene once, he or she brings the DVC back home, and then edits the recorded materials and re-records the thus edited materials. Therefore, recording data relating to the contents of the recorded materials as well as the contents of arrangements made on the scene are also important. It is convenient that these recorded data are recorded on an information sheet and the information sheet is stored in a storage case together the DVC.

However, since a conventional storage case has a thickness which has slight room with respect to the thickness of the DVC, the quantity of information sheets, which can be stored together with the DVC in the storage case, is quite limited.

Therefore, in case where the number of information sheets to be piled up on top of another is large, there arise some problems. For example, when the cover part of the storage case is opened, the information sheets can jump out from the storage case; or, the information sheets cannot be settled firmly in position within the storage case, so that the end portions of the information sheets can be folded back or can stick out from the storage case, thereby being unable to close the cover part of the storage case.

It is an object of the invention to provide a storage case for storing a magnetic tape cassette which is not only simple in structure but also capable of storing therein a large quantity of information sheets at a given position and in a good posture as well as with a good operation efficiency together with a magnetic tape cassette.

DISCLOSURE OF THE INVENTION

In attaining the above object, according to a first invention, there is provided a storage case for storing a magnetic tape cassette, comprising: a storage part including a bottom plate opposed to the back surface or front surface of the magnetic tape cassette, and inner walls disposed erect on the edge portions of the bottom plate for enclosing the side surfaces of the magnetic tape cassette; and, a cover part openably and closably connected to the storage part through a hinge part, including outer walls for enclosing the inner walls of the storage part and a cover plate with the present outer walls disposed erect thereon, wherein, on the neighboring portions of the connecting portions between the bottom plate and the inner walls of the storage part and/or on the neighboring portions of the connecting portions between the bottom plate and the outer walls of the cover part, there are provided one or more pairs of ribs so as to project inwardly of the storage part or the cover part; and, also wherein the ribs define, between the back or front surface of the magnetic tape cassette and the bottom plate of the storage part or the cover plate of the cover part, a required clearance capable of storing an information sheet therein.

In case where the ribs are disposed on the storage part, there may be disposed one rib in one of the connecting portions between the bottom plate and inner walls of the storage part, and two ribs in the other; that is, a total of at least three ribs may be disposed. According to this structure, the position and posture of the information sheet stored in the required clearance can be held more positively. And, since the information sheet is pressed due to the weight of the stored magnetic tape cassette, the information sheet can be held stably.

Also, the ribs may also be disposed substantially over the entire areas of at least two connecting portions between the bottom plate and three inner walls of the storage part. In this case, the connecting portions, on which the ribs are to be disposed, may be the mutually adjoining connecting portions or the mutually opposed connecting portions.

The ribs can be disposed in such a manner that they extend into the bottom plate and inner walls of the storage part. This not only can enhance the rigidity of the whole of the storage part but also can prevent the inner walls of the storage part against deformation such as falls.

Also, there may also be disposed, on the cover part, ribs which are similar to the ribs to be disposed on the storage part and thus there may be defined in the cover part a portion for storing the information sheet therein. In case where the ribs are disposed on the cover part, one of the ribs may be disposed on one of the connecting portions between the cover plate and outer walls of the cover part, and the remaining two ribs may be disposed on the other two connecting portions; that is, a total of at least three ribs may be disposed. Due to this structure, the position and posture of the information sheets stored in the required clearance can be held more positively.

Also, the ribs may also be disposed so as to extend substantially over the entire areas of at least two connecting portions between the cover plate and outer walls of the cover part. In this case, the connecting portions, on which the ribs are to be disposed, may be the mutually adjoining connecting portions or the mutually opposed connecting portions.

The ribs can be disposed such that they extend into the cover plate and outer walls of the cover part. This not only can enhance the rigidity of the whole of the cover part but also can prevent the outer walls of the cover part against deformation such as falls.

When the magnetic tape cassette is stored into the storage part, the back surface thereof may be opposed to the storage part or the front surface thereof may be opposed to the storage part.

Also, the magnetic tape cassette may be stored in such a manner that it is firstly stored into the cover part and the storage part is then closed with respect to the cover part. In this case, the back surface of the magnetic tape cassette may be opposed to the cover part or the front surface thereof may be opposed to the cover part.

And, in attaining the above object, according to a second invention, there is provided a storage case for storing a magnetic tape cassette, comprising: a storage part capable of storing the magnetic tape cassette therein; and, a cover part including a cover plate opposed to the front surface or back surface of the magnetic tape cassette stored in the storage part and side walls disposed erect on the edge portion of the cover plate, and connected openably and closably to the storage part through a hinge part, characterized by: a pair of ribs provided on the neighboring portions of the connecting portions of the cover plate and the side walls of the cover part so as to project inwardly of the cover part; and, a sheet-shaped member disposed substantially parallel to the cover plate of the cover part with a given distance between them, with the two end portions thereof fixed to the ribs, the sheet-shaped member defining, between the cover plate of the cover part and itself, a required clearance capable of storing an information sheet therein.

According to the second invention, since the end portion of the information sheet is inserted into the required clearance defined by and between the cover plate of the cover part and sheet-shaped member, the information sheet can be stored at a given position in the interior of the cover part and in a given posture as well as with a good operation efficiency. Thanks to this, the information sheet can be positively prevented from sticking, flying and dropping down out of the magnetic tape cassette storage case.

The ribs can be disposed such that they extend into the cover plate and side walls of the cover part. This not only can enhance the rigidity of the whole of the cover part but also can prevent the side walls of the cover part against deformation such as falls.

Further, in achieving the above object, according to a third invention, there is provided a storage case for storing a magnetic tape cassette consisting of an integral body comprising: a storage part capable of storing the magnetic tape cassette therein; a cover part including outer walls for enclosing the storage part; and, a hinge part for connecting together the storage part and cover part in an openable and closable manner, wherein the dimension of the hinge part is set such that, when the cover part is closed while the magnetic tape cassette is stored in the storage part, between the cover part and magnetic tape cassette, there can be defined a clearance capable of storing a sheet bundle therein; and, in the range of such clearance and on the hinge part, there are disposed one or more ribs each including mutually opposed surfaces.

According to the third invention, the ribs, which respectively have mutually opposed surfaces, function as hold means. That is, the storage case according to the third invention, when the sheet bundle such as an information recording sheet bundle is stored into the storage case, can hold the sheet bundle through the mutually opposed surfaces of the ribs.

Therefore, not only the position shift of the sheet bundle within the storage case but also the jump-out of the sheet bundle from the storage case can be prevented.

Preferably, the rib may have a function to be able to prevent the magnetic tape cassette from being rickety when the magnetic tape cassette is stored in the storage case.

BEST MODE FOR CARRYING OUT THE INVENTION

Now, description will be given below of the best modes for carrying out the invention with reference to the accompanying drawings.

Figure 1:
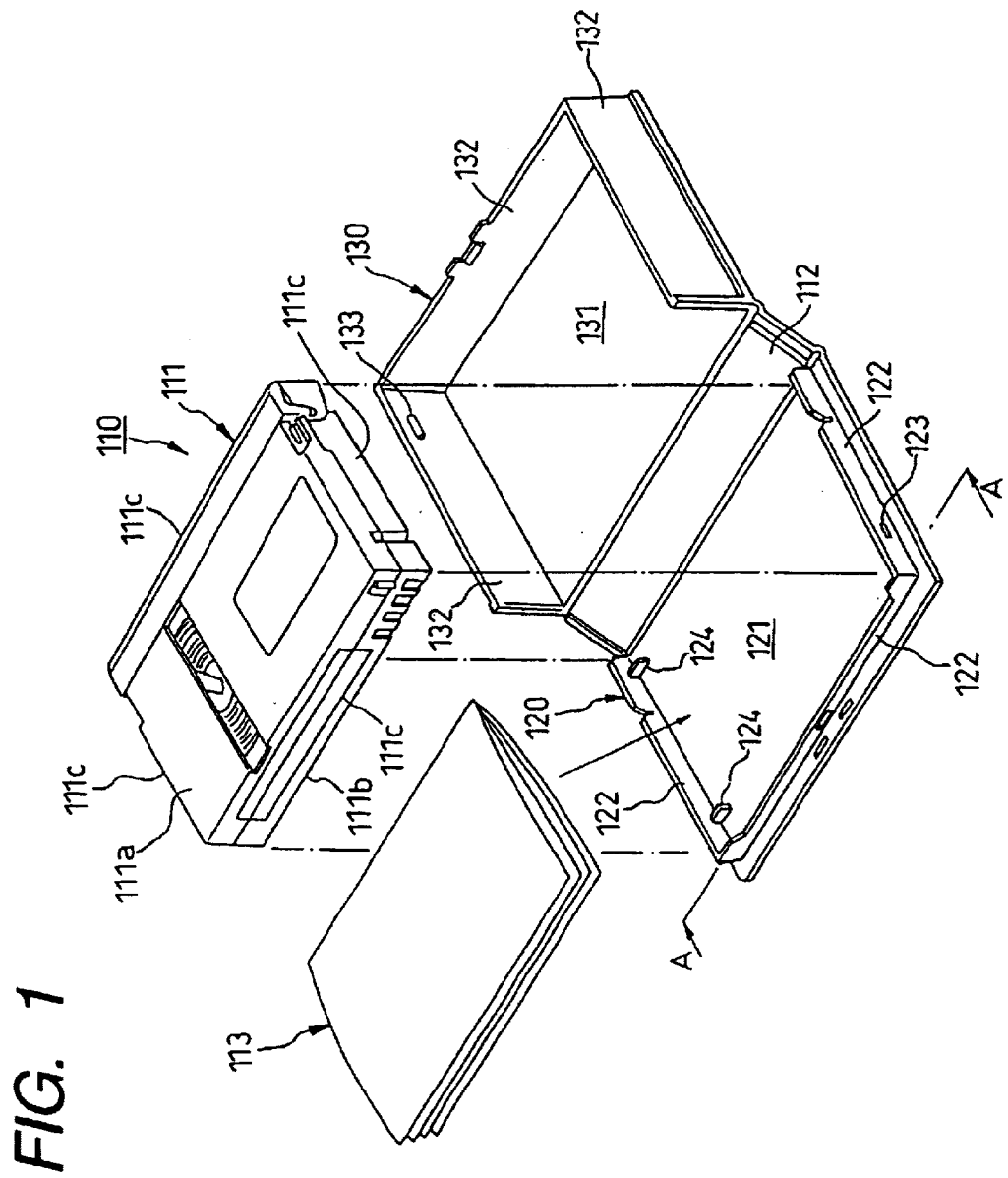
FIG. 1 is an exploded perspective view of a storage case for storing a magnetic tape cassette according to a first embodiment belonging to the first mode for carrying out the invention.
Figure 2:
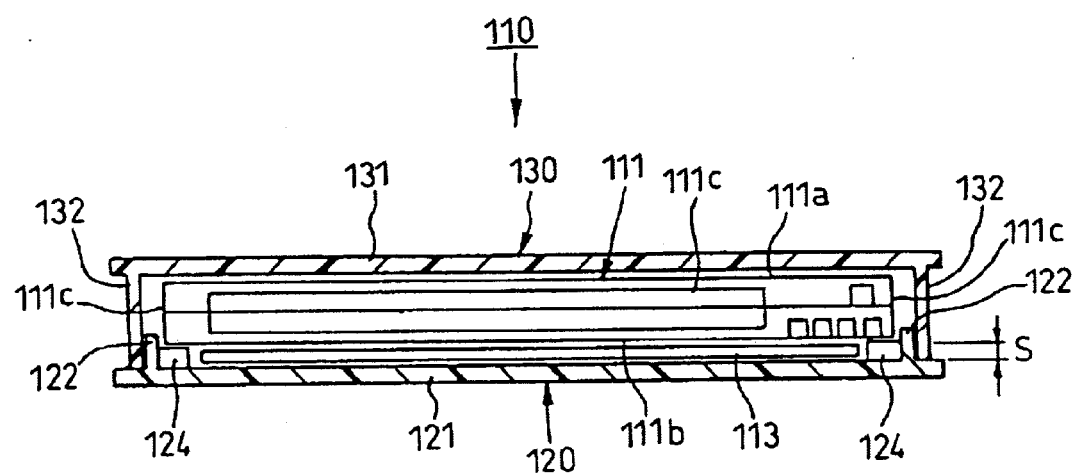
FIG. 2 is a section view taken along the arrow mark A shown in FIG. 1, showing a state of the magnetic tape cassette storage case in which a magnetic tape cassette and information sheets are stored therein and a cover part thereof is closed.

FIG. 1 is an exploded perspective view of a storage case for storing a magnetic tape cassette according to a first embodiment belonging to the first mode for carrying out the invention; and, FIG. 2 is a section view taken along the arrow mark A shown in FIG. 1, showing a state of the magnetic tape cassette storage case in which a magnetic tape cassette and information sheets are stored therein and a cover part thereof is closed.

In FIGS. 1 and 2, a magnetic tape cassette storage case 110 comprises a storage part 120 capable of storing therein a magnetic tape cassette 111 such as a DVC, and a cover part 130 connected to the storage part 120 through a hinge part 112 in such a manner that it can be opened and closed with respect to the storage part 120.

The storage part 120 includes a bottom plate 121 and three inner walls 122. The bottom plate 121 is formed in a rectangular shape so as to correspond to the outer shapes of the front and rear surfaces 111a and 111b of the magnetic tape cassette 111. The three inner walls 122 are respectively disposed erect substantially at right angles to the bottom plate 121; and, specifically, one of them is disposed in one edge portion of the bottom plate 121 which extends along the longitudinal direction of the bottom plate 121, and the remaining two inner walls 122 are disposed respectively in the two edge portions of the bottom plate 121 which extend along the transverse direction thereof.

The inner walls 122 are disposed so as to cooperate in forming a frame shape. That is, the magnetic tape cassette 111 can be loosely fitted with the interior portions of the inner walls 122 and thus the three inner walls 122 respectively enclose in part the three side surfaces 111c of the magnetic tape cassette 111.

In the outer surfaces of the two corner portions of the inner walls 122 on the opposite sides to the hinge part 112, there are formed securing recessed portions 123, respectively. The two securing recessed portions 123, when the cover part 130 is closed, are elastically engaged with securing projections 133 (which will be discussed later) provided on the cover part 130 to thereby be able to hold the cover part 130 in a closed state with respect to the storage part 120. On the neighboring portions of the connecting portions between the bottom plate 121 and inner walls 122 of the storage part 120, there are disposed a pair of ribs 124 on the right side in FIG. 1 and another pair of ribs 124 on the left in FIG. 1, that is, a total of two pairs of ribs 124 in such a manner that they are projected inwardly of the storage part 120. The ribs 124, in the closed state of the cover part 130, are respectively pressed against the magnetic tape cassette 111, which is stored in the storage part 120, toward the cover part 130 side to thereby hold the magnetic tape cassette 111 between the cover part 130 and itself and, at the same time, the ribs 124 define a required clearance S between the rear surface 111b (in FIG. 1, lower surface) of the magnetic tape cassette 111 and bottom plate 121, in which information sheets 113 can be stored.

The cover part 130 includes a cover plate 131 and the outer walls 132. The cover plate 131 is opposed to the front surface 111a of the magnetic tape cassette 111 stored in the storage part 120. One of the outer walls 132 is disposed erect on one edge portion of the cover plate 131, which is situated on the opposite side to the hinge part 112 and extends along the longitudinal direction of the cover plate 131; and, the two remaining outer walls 132 are disposed erect on the two edge portions of the cover plate 131 extending along the transverse direction of the cover plate 131. In the closed state of the cover part 130, the cover plate 131 encloses the respective side surfaces 111c of the magnetic tape cassette 111 and the inner walls 122 of the storage part 120 from outside.

One edge portion of the cover part 130 extending along the longitudinal direction of the cover plate 131 is connected through the hinge part 112 to one edge portion of the storage part 120 extending along the longitudinal direction of the storage part 120.

On the neighboring portions of the end portions of the outer walls 132, which are situated on the opposite side to the hinge part 112 and extend along the transverse direction of the cover part 130, there are projectingly provided securing projections 133 respectively. The securing projections 133 can be elastically engaged with the securing recessed portions 123 of the storage part 120.

An information sheet 113, which is to be stored in the clearance S defined by the ribs 124 of the storage part 120, has such an outside dimension as corresponds to the dimension of the portion of the bottom plate 121 of the storage part 120 that is enclosed by the ribs 124; and, as shown in FIG. 1, the information sheet 113 is folded two or more times or it is composed of two or more sheets bundled together like a pamphlet. Therefore, in case where the lower surface (in FIG. 1) of the information sheet 113 is contacted with the portion of the bottom plate 121 enclosed by the ribs 124 and the positions of the four corners thereof are restricted by the ribs 124, the information sheet 113 can be stored at a given position within the storage part 120 in a given posture. Due to this, the information sheet 113 can be prevented from sticking, jumping and dropping down out of the storage case 110, thereby being able to remove the ill influences that would be otherwise caused.

Figure 3:
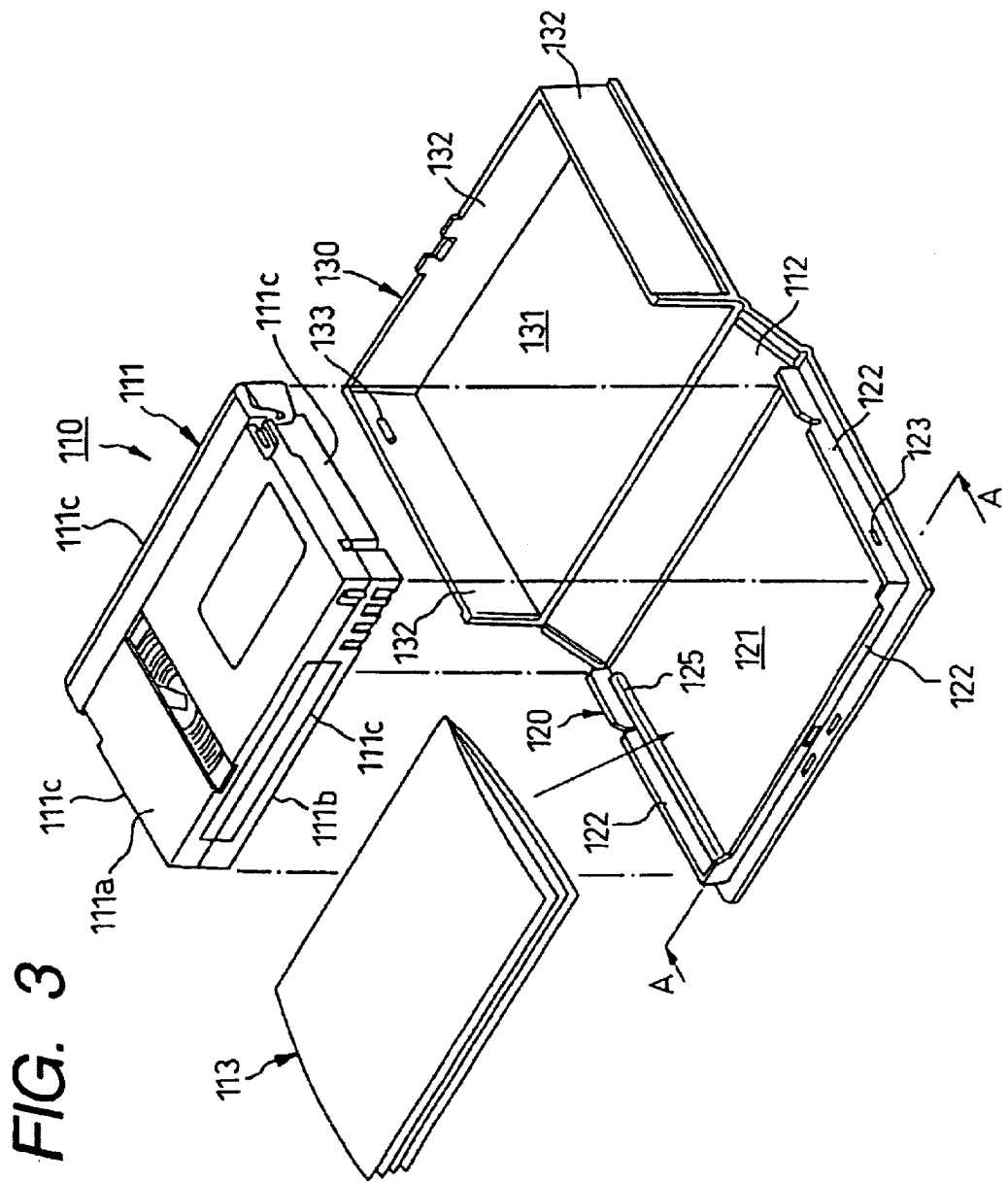
FIG. 3 is an exploded perspective view of a storage case for storing a magnetic tape cassette according to a second embodiment belonging to the first mode for carrying out the invention.

Now, FIG. 3 is an exploded perspective view of a storage case for storing a magnetic tape cassette according to a second embodiment belonging to the first mode for carrying out the invention.

In the second embodiment, in the neighboring portions of the connecting portions between the bottom plate 121 and inner walls 122 of the storage part 120, there are provided three ribs 125 which respectively extend along the substantially entire areas of the respective connecting portions. Although, in FIG. 3, there is shown only one rib 125 which is disposed inside one inner wall 122, inside the other two inner walls 122 as well, there are similarly disposed two ribs 125 respectively along the substantially entire areas of their associated connecting portions.

The remaining structures and operations of the second embodiment are similar to those of the above-described first embodiment.

By the way, in the second embodiment, the ribs 125 are disposed respectively along the substantially entire areas of the three connecting portions between the bottom plate 121 and inner walls 122 of the storage part 120. However, alternatively, the ribs 125 may also be disposed along the substantially entire areas of any two of the three connecting portions. In this case, the connecting portions where the ribs 125 are to be disposed may be the mutually adjoining connecting portions or may be the mutually opposed connecting portions.

Figure 4:
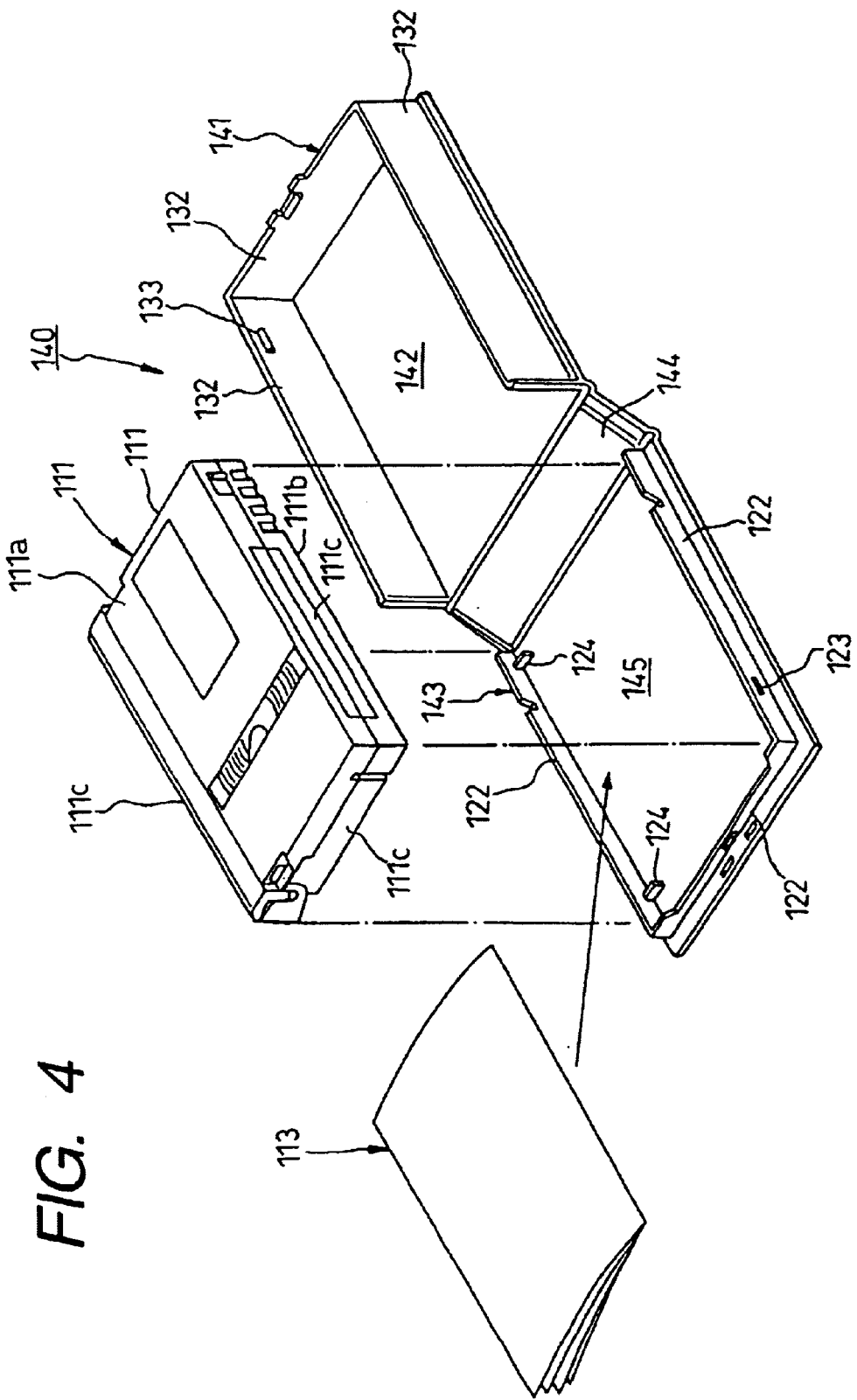
FIG. 4 is an exploded perspective view of a storage case for storing a magnetic tape cassette according to a third embodiment belonging to the first mode for carrying out the invention.

Now, FIG. 4 is an exploded perspective view of a storage case for storing a magnetic tape cassette according to a third embodiment belonging to the first mode for carrying out the invention.

In the third embodiment, one edge portion of a cover part 141 extending along the transverse direction of a cover plate 142 is connected through a hinge part 144 with one edge portion of a storage part 143 extending along the transverse direction of a bottom plate 145 of a storage part 143, thereby forming a magnetic tape cassette storage case 140 of a so called longitudinally opening type.

The remaining structures and operations of the third embodiment are similar to those of the previously described first embodiment.

By the way, in the third embodiment as well, instead of the shown ribs 124, similarly to the above-mentioned second embodiment, ribs 125 may be disposed along the substantially entire areas of the connecting portions.

As described above, according to the first to third embodiments, the ribs 124 are respectively disposed in the neighboring portions of the connecting portions between the bottom plates 121, 145 and inner walls 122 of the storage parts 120, 143 in such a manner that they extend into the bottom plates 121, 145 and inner walls 122 and project inwardly of the storage part 120, 143; and, between the rear surface 111b of the magnetic tape cassette 111 held by and between the cover parts 130, 141 and the bottom plates 121, 145 of the storage part 120, 143, there is defined a required clearance S into which the information sheet 113 can be stored.

Therefore, the magnetic tape cassette storage cases according to the first to third embodiments not only are simple in structure but also are capable of storing a large quantity of information sheets 113 together with the magnetic tape cassette 111 at a given position, in a given posture and with a high operation efficiency. In other words, the first to third embodiments are capable of enhancing the storability of the magnetic tape cassette 111 and information sheet 113 as well as are capable of enhancing the position accuracy of the information sheet 113 within the magnetic tape cassette storage cases 110, 140.

This can eliminate the possibility that, for example, the position-shifted information sheet 113 can be held by and between the outer walls 132 of the cover parts 130, 141 and the inner walls 122 of the storage parts 120, 143 to thereby be unable to close the cover parts 130, 141.

Also, since the ribs 124 are disposed so as to extend into both of the bottom plates 121, 145 and inner walls 122 of the storage parts 120, 143, the rigidity of the whole of the storage parts 120, 43 can be enhanced, which makes it possible to prevent the inner walls 122 of the storage parts 120, 143 against their deformation such as their falls.

The above-mentioned first to third embodiments are structured such that the ribs 124, 125 are disposed on the storage parts 120, 143. However, alternatively, the ribs 124, 125 may also be disposed on the cover parts 130, 141.

Figure 5:
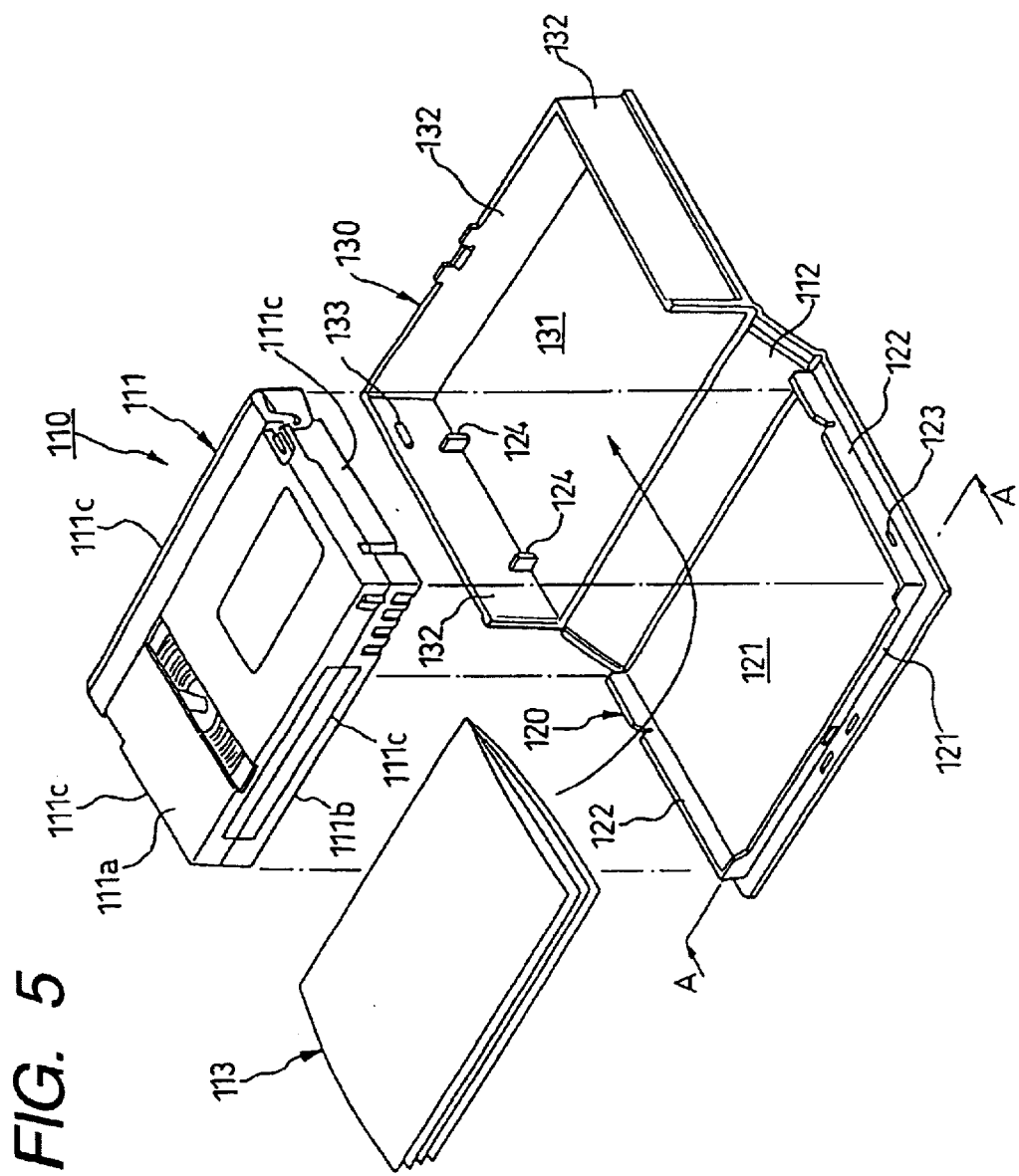
FIG. 5 is an exploded perspective view of a storage case for storing a magnetic tape cassette according to a fourth embodiment belonging to the first mode for carrying out the invention.

Now, FIG. 5 is a perspective view of a storage case for storing a magnetic tape cassette according to a fourth embodiment belonging to the first mode for carrying out the invention. The fourth embodiment is different in structure from the first embodiment in that the ribs 124 of the first embodiment shown in FIG. 1 are disposed on the cover part 130, while the remaining portions of the fourth embodiment are the same in structure as the first embodiment. Therefore, the same parts of the fourth embodiments as the first embodiment are given the same designations and thus the detailed description thereof is omitted here.

Figure 6:
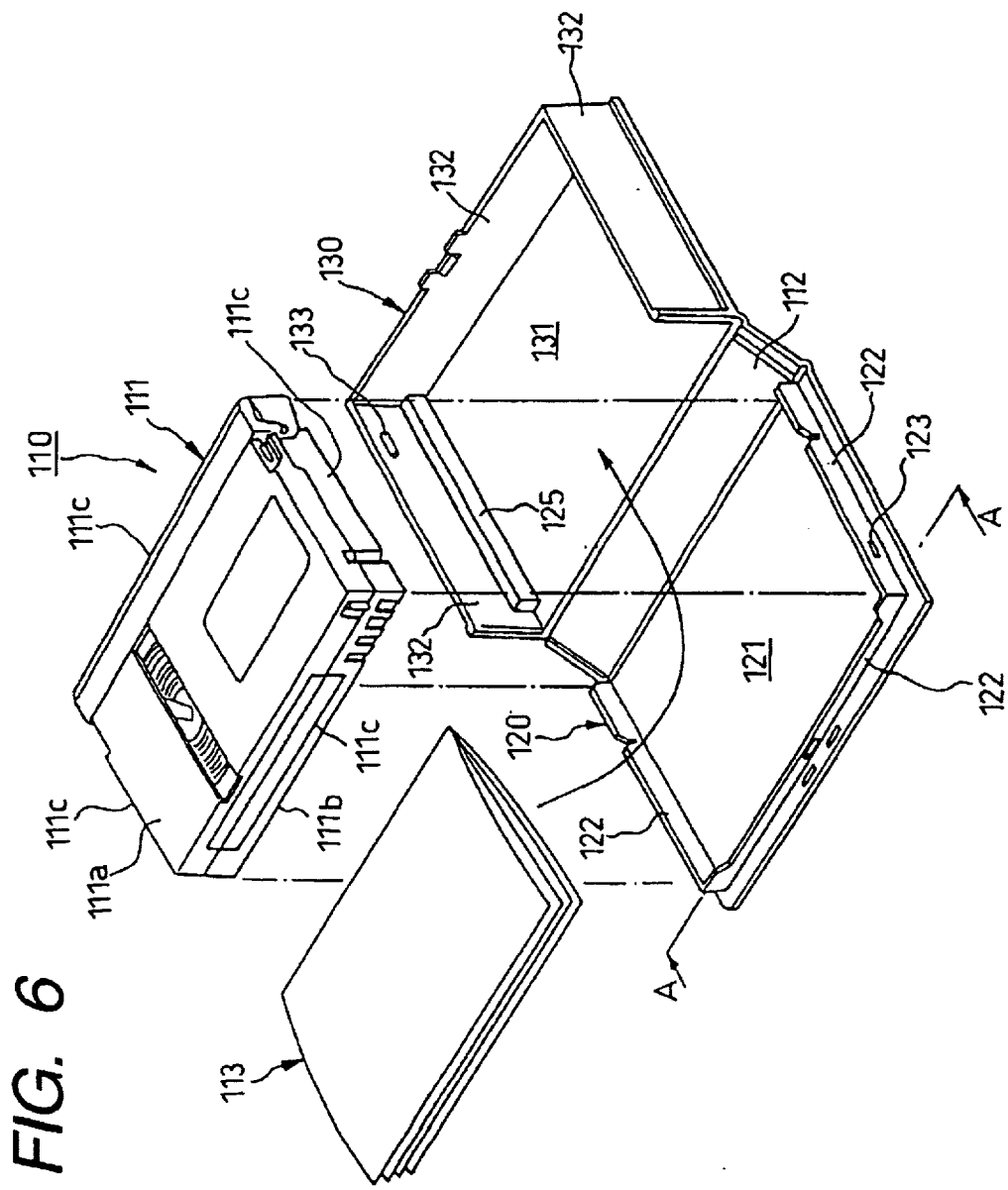
FIG. 6 is an exploded perspective view of a storage case for storing a magnetic tape cassette according to a fifth embodiment belonging to the first mode for carrying out the invention.

Also, FIG. 6 is a perspective view of a storage case for storing a magnetic tape cassette according to a fifth embodiment belonging to the first mode for carrying out the invention. The fifth embodiment is different in structure from the second embodiment in that the ribs 125 of the second embodiment shown in FIG. 3 are disposed on the cover part 130, while the remaining portions of the fifth embodiment are the same in structure as the second embodiment. Therefore, the same parts of the fifth embodiments as the second embodiment are given the same designations and thus the detailed description thereof is omitted here.

Figure 7:
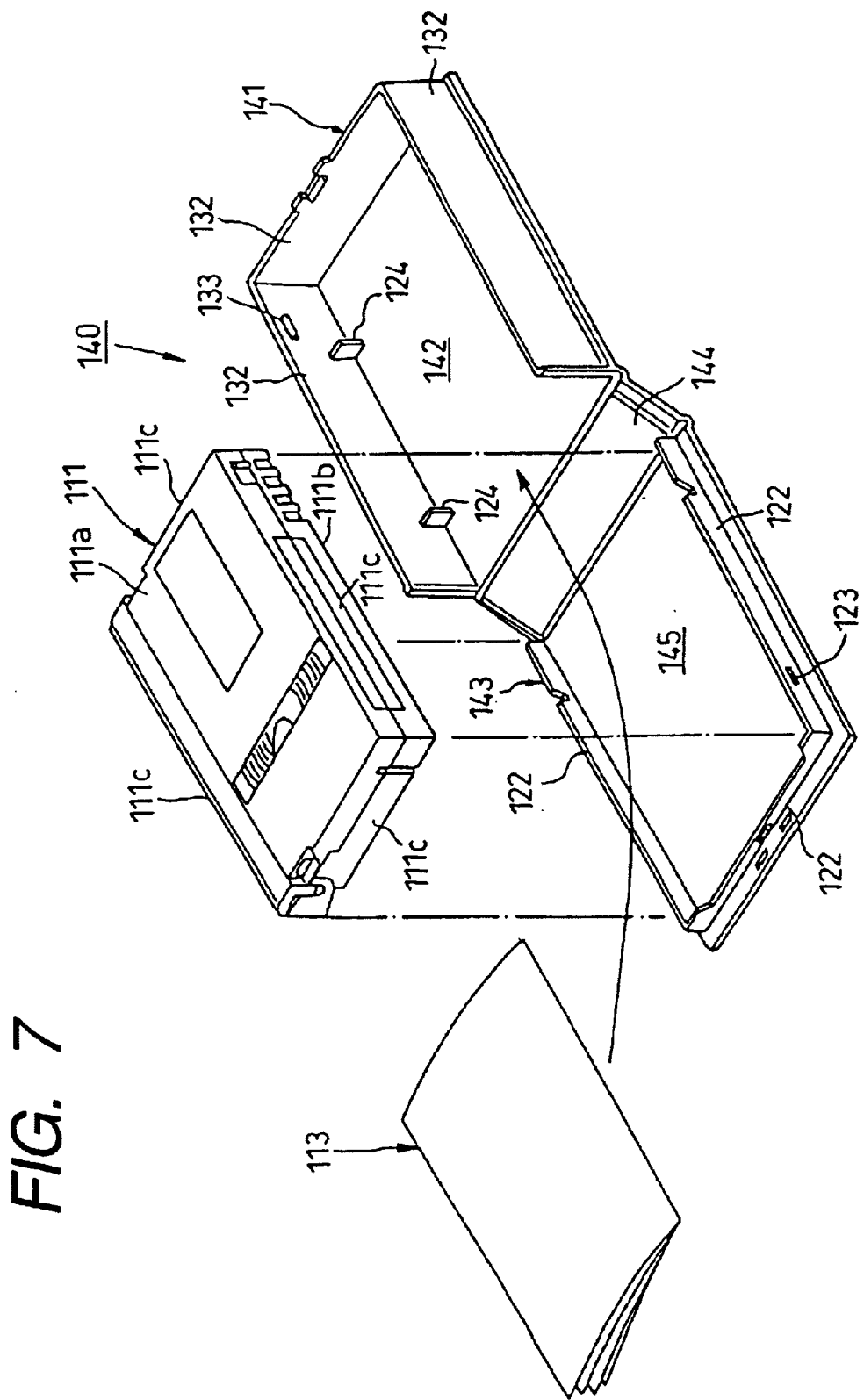
FIG. 7 is an exploded perspective view of a storage case for storing a magnetic tape cassette according to a sixth embodiment belonging to the first mode for carrying out the invention.

Further, FIG. 7 is a perspective view of a storage case for storing a magnetic tape cassette according to a sixth embodiment belonging to the first mode for carrying out the invention. The sixth embodiment is different in structure from the third embodiment in that the ribs 124 of the third embodiment shown in FIG. 4 are disposed on the cover part 141 thereof, while the remaining portions of the sixth embodiment are the same in structure as the third embodiment. Therefore, the same parts of the sixth embodiments as the third embodiment are given the same designations and thus the detailed description thereof is omitted here.

By the way, in the above-mentioned first to sixth embodiments, there is shown such structure that, while the back surface of the magnetic tape cassette 110 is opposed to the storage parts 120, 143, the magnetic tape cassette 110 is stored in the storage parts 120, 143. However, alternatively, it is also possible to employ a structure that, while the front surface of the magnetic tape cassette 110 is opposed to the storage parts 120, 143, the magnetic tape cassette 110 is stored in the storage parts 120, 143.

Also, in the above-mentioned first to sixth embodiments, the magnetic tape cassette 110 is firstly stored into the storage parts 120, 143 and, after then, the cover parts 130, 141 is closed. However, alternatively, the magnetic tape cassette 110 may be firstly stored into the cover parts 130, 141 and, after then, the storage parts 120, 143 may be put onto the cover parts 130, 141 to thereby close the storage case. In this case, the magnetic tape cassette 110 may stored into the cover parts 130, 141 with the front surface of the magnetic tape cassette 110 opposed to the cover parts 130, 141; or, the magnetic tape cassette 110 may stored into the cover parts 130, 141 with the back surface of the magnetic tape cassette 110 opposed to the cover parts 130, 141.

Next, description will be given below of the second mode for carrying out the invention.

Figure 8:
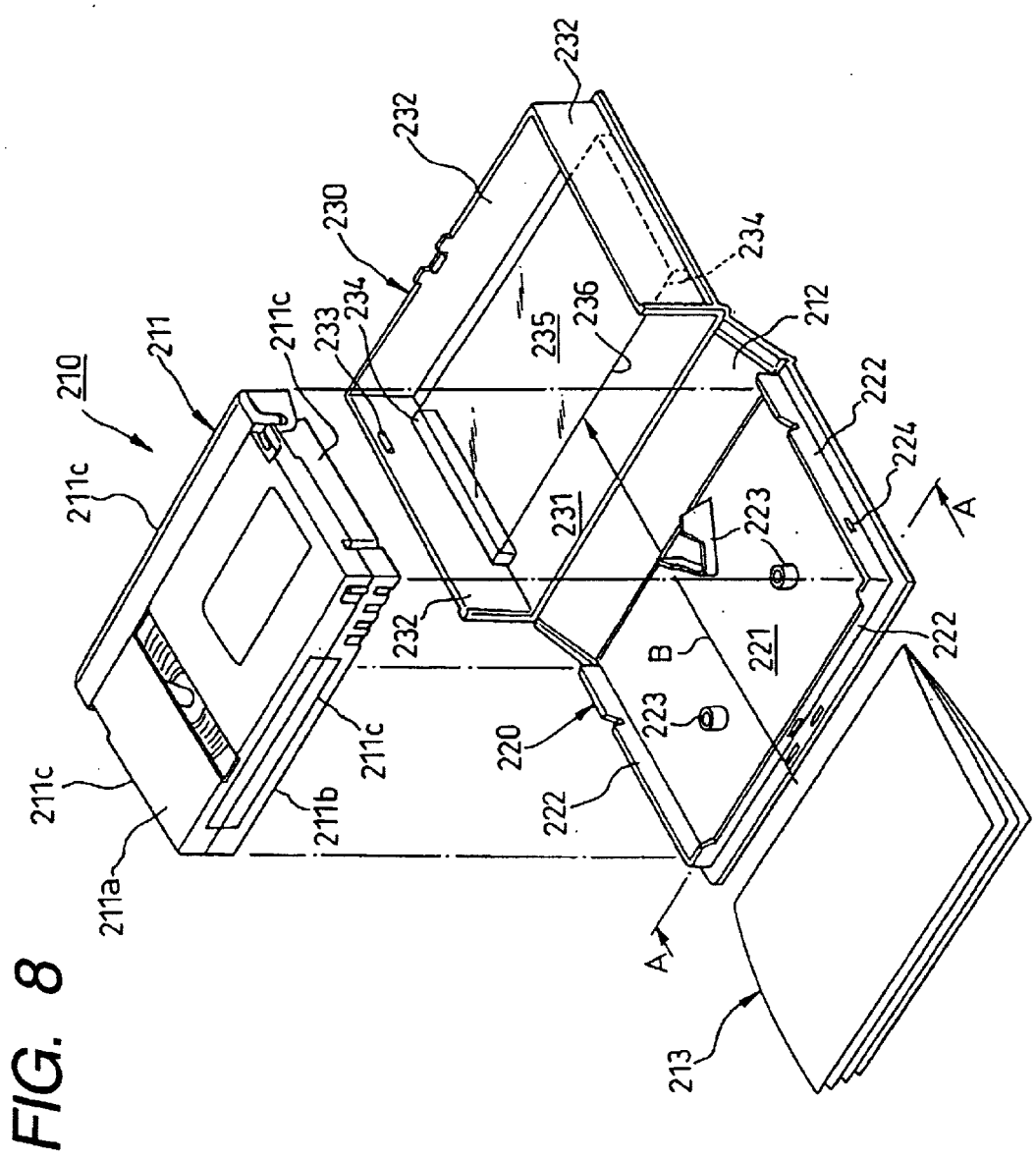
FIG. 8 is an exploded perspective view of a storage case for storing a magnetic tape cassette according to a seventh embodiment belonging to the second mode for carrying out the invention.
Figure 9:
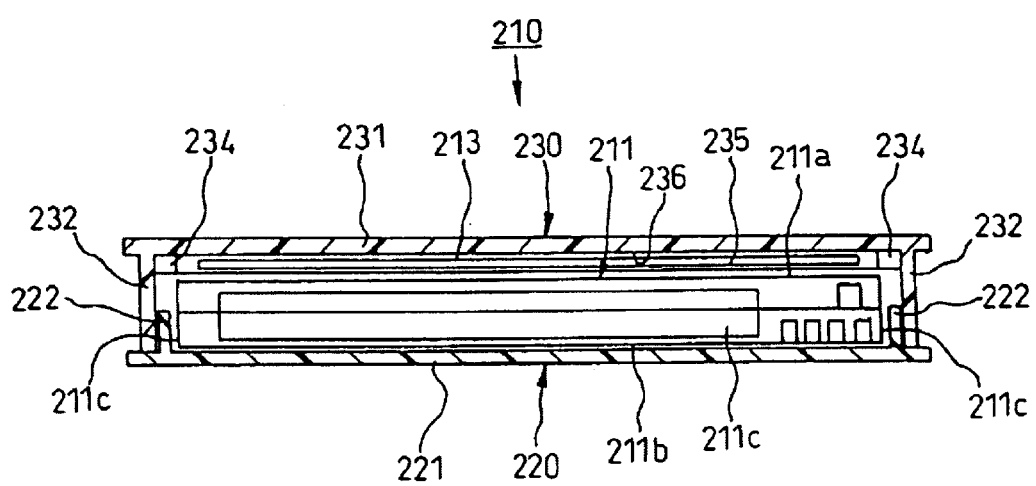
FIG. 9 is a section view taken along the arrow mark A shown in FIG. 8, showing a state of the magnetic tape cassette storage case in which a magnetic tape cassette and information sheets are stored therein and a cover part thereof is closed.
Figure 10A:
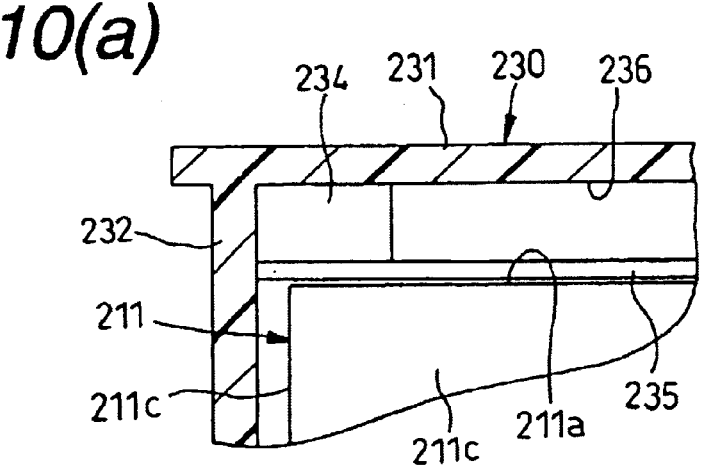
FIGS. 10(a) 10(b) and 10(c) are enlarged sectional views of the main portions of the magnetic tape cassette storage case shown in FIG. 9.
Figure 10B:
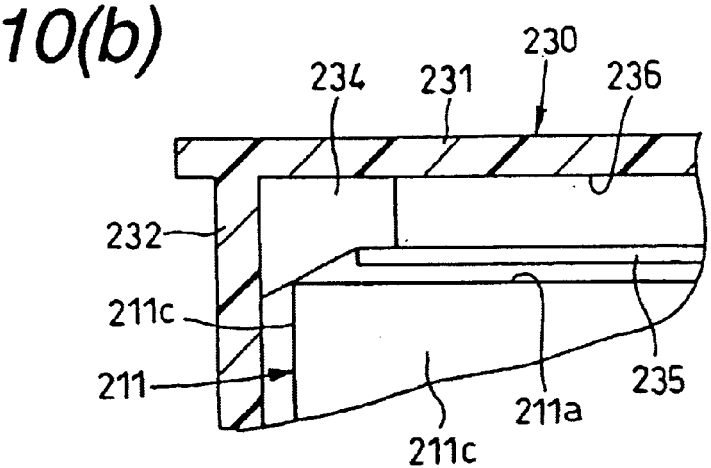
Figure 10C:
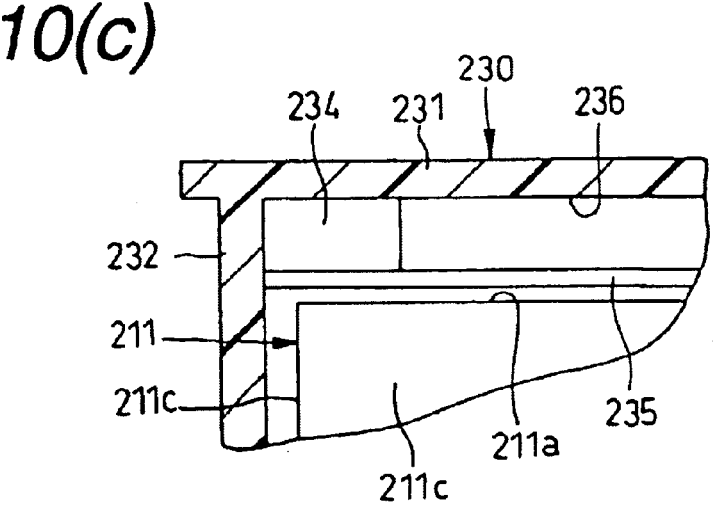

FIG. 8 is a perspective view of a storage case for storing a magnetic tape cassette according to a seventh embodiment belonging to the second mode for carrying out the invention; and, FIG. 9 is a section view taken along the arrow mark A shown in FIG. 8, showing a state of the magnetic tape cassette storage case in which a magnetic tape cassette and information sheets are stored therein and a cover part thereof is closed. Also, FIG. 10 is an enlarged section view of the main portions of the magnetic tape cassette storage case shown in FIG. 9 and, specifically, FIGS. 10(a) to (c) respectively show different structures of the magnetic tape cassette storage case.

In FIGS. 8 and 9, a magnetic tape cassette storage case 210 comprises a storage part 220 capable of storing therein a magnetic tape cassette 211 such as a DVC, and a cover part 230 connected through a hinge part 212 to the storage part 220 in such a manner that it can be opened and closed.

The storage part 220 includes a bottom plate 221 and three inner walls 222. The bottom plate 221 is formed in such a rectangular shape as corresponds to the outside dimensions of the front and rear surfaces 211a, 211b of the magnetic tape cassette 211. The inner walls 222 are respectively disposed substantially at right angles to the bottom plate 221; and, specifically, one of them is disposed on one edge portion of the bottom plate 221 extending along the longitudinal direction thereof and the remaining two inner walls are disposed respectively on the two edge portions of the bottom plate 221 extending along the transverse direction thereof.

On the inner surface (in FIG. 8, upper surface) side of the bottom plate 221, there are projectingly provided a plurality of cassette securing projections 223 which correspond in shape to the uneven shape (not shown) of the rear surface 211b (in FIG. 8, lower surface) of the magnetic tape cassette 211.

The inner walls 222 are disposed so as to form a frame shape: that is, the magnetic tape cassette 211 can be loosely fitted into the frame shape, while the inner walls 222 enclose in part the three side surfaces 211c of the magnetic tape cassette 211 respectively.

In the outer surfaces of the two corner portions of the inner walls 222 on the opposite side to the hinge part 212, there are formed securing recessed portions 224 respectively. Referring to the operation of the securing recessed portions 224, in the closed state of the cover part 230, in case where the securing projections 233 (which will be discussed later) of the cover part 230 are elastically engaged with the securing recessed portions 224, the cover part 230 can be held in a closed state with respect to the storage part 220.

The cover part 230 includes a cover plate 231 and side walls 232. The cover plate 231 is disposed opposed to the front surface 211a of the magnetic tape cassette 211 that is stored in the storage part 220. One of the side walls 232 is disposed erect on one edge portion of the cover plate 231 which extends along the longitudinal direction thereof and is present on the opposite side to the hinge part 212; and, the remaining two side walls 232 are disposed erect on the two edge portions of the cover plate 231 which extend along the transverse direction thereof. In the closed state of the cover part 230, the three side walls 232 respectively enclose the side surfaces 211c of the magnetic tape cassette 211 and the inner walls 222 of the storage part 220 from outside.

The cover part 230 is structured such that one edge portion of the cover plate 231 along the longitudinal direction thereof is connected through the hinge part 212 to one edge portion of the storage part 220 along the longitudinal direction thereof.

On the neighboring portions of the end portions of the inner surfaces of the side walls 232 which extend along the transverse direction of the cover part 230 and are present on the opposite side to the hinge part 212, there are projectingly provided securing projections 233 respectively. The respective securing projections 233 can be elastically engaged into their associated securing recessed portions 224 of the storage part 220.

On the neighboring portions of the connecting portions between the cover plate 231 and side walls 232 of the cover part 230, there are projectingly provided a pair of ribs 234 along the transverse direction of the cover plate 231 and side walls 232 in such a manner that they extend into the cover plate 231 and side walls 232 and project inwardly of the cover part 230.

Between the ribs 234, there is interposed a sheet-shaped member 235 composed of a PET film in such a manner that it extends substantially parallel to the cover plate 231 of the cover part 230 with a given clearance between them. That is, the sheet-shaped member 235 is disposed so as to extend substantially parallel to the cover plate 231 of the cover part 230 while their two edge portions in the longitudinal direction thereof are fixed to the ribs 234 by heat welding. The sheet-shaped member 235 cooperates together with the cover plate 231 of the cover part 230 in defining a required clearance 236 between them into which the information sheet 213 can be stored.

The ribs 234, for example, as shown in FIG. 10(a), are capable of pressing the magnetic tape cassette 211 stored in the storage part 220 toward the storage part 220 through the sheet-shaped member 235 in the closed state of the cover part 230 to thereby hold the magnetic tape cassette 211 between the storage part 220 and themselves.

Also, for example, as shown in FIG. 10(b), the ribs 234 are capable of pressing the magnetic tape cassette 211 stored in the storage part 220 toward the storage part 220 not through the sheet-shaped member 235 in the closed state of the cover part 230 to thereby hold the magnetic tape cassette 211 between the storage part 220 and themselves.

Further, for example, as shown in FIG. 10(c), the ribs 234 can be controlled such that they do not press the magnetic tape cassette 211 stored in the storage part 220 toward the storage part 220 in the closed state of the cover part 230.

The information sheet 213, which is to be stored in the clearance 236, has such an outside dimension as corresponds to the dimension of the bottom plate 231 of the cover part 230; and, as shown in FIG. 8, the information sheet 113 is folded two or more times or it is composed of two or more sheets bundled together like a pamphlet. Therefore, in case where one end portion (in FIG. 8, the deep-side end portion) of the information sheet 213 is inserted along the arrow mark B direction into the clearance 236 from the hinge part 212 side (in FIG. 8, from this side) and is guided to the inner surface of the cover plate 231 and the inner surface of the sheet-shaped member 235, the information sheet 213 can be stored smoothly and positively into a given position within the cover part 230 in a given posture. Due to this, the information sheet 213 can be prevented from sticking, jumping and dropping down out of the storage case 210, which in turn makes it possible to remove the ill influences that would be otherwise caused.

Figure 11:
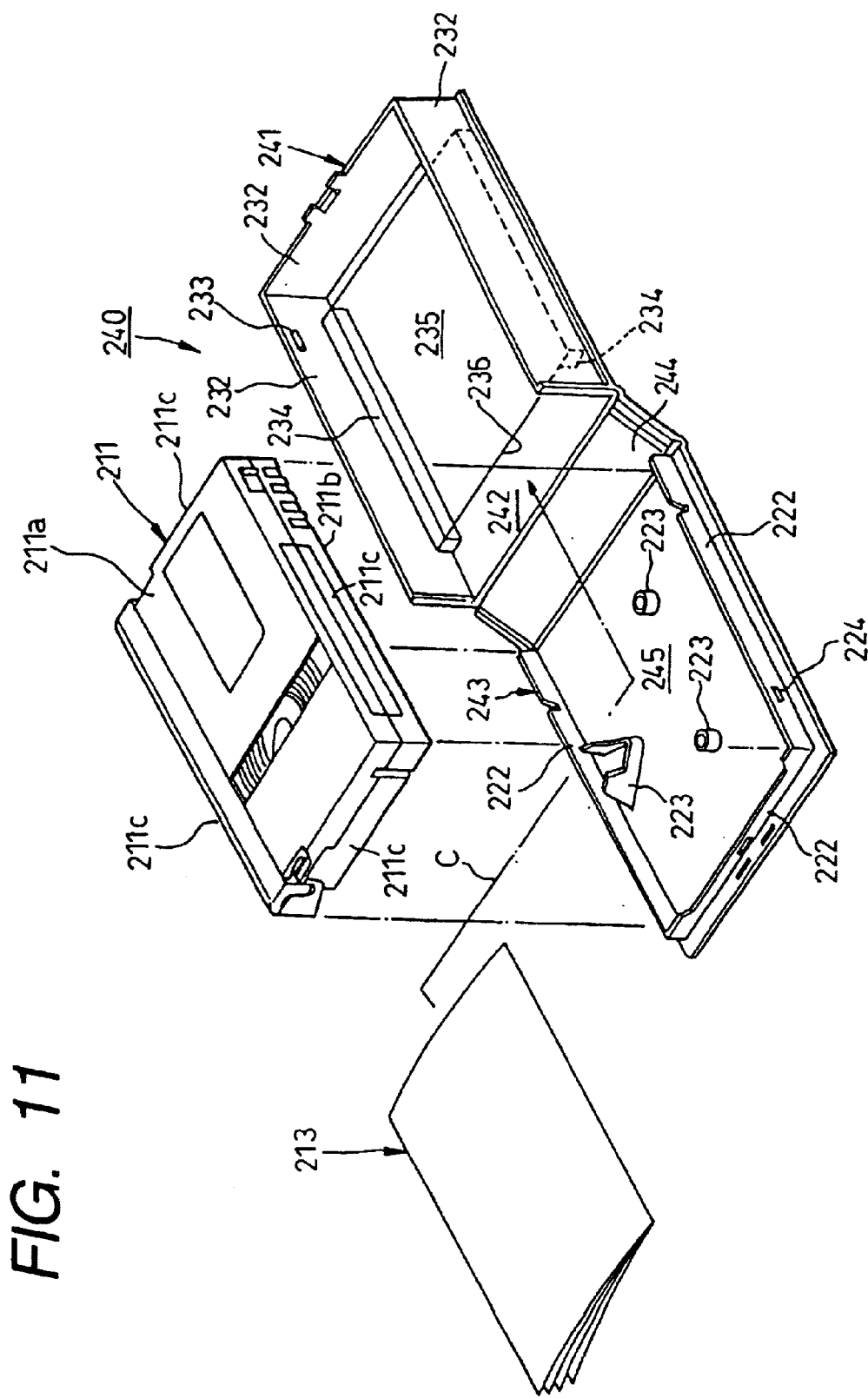
FIG. 11 is an exploded perspective view of a storage case for storing a magnetic tape cassette according to an eighth embodiment belonging to the second mode for carrying out the invention.

Now, FIG. 11 is an exploded perspective view of a storage case for storing a magnetic tape cassette according to an eighth embodiment belonging to the second mode for carrying out the invention.

In the present embodiment, one edge portion of a cover part 241 extending along the transverse direction of a cover plate 242 is connected through a hinge part 244 to one edge portion of a storage part 243 extending along the transverse direction of a bottom plate 245, thereby constituting a magnetic tape cassette storage case 240 of a so called longitudinally opening type.

In the magnetic tape cassette storage case 240, one end portion (in FIG. 11, the deep-side end portion) of an information sheet 213 is inserted into a clearance 236 along the arrow mark C direction from the hinge 244 side (in FIG. 11, from this side), and is guided to the inner surface of the cover plate 242 and the inner surface of a sheet-shaped member 235, so that the information sheet 213 can be stored smoothly and positively at a given position within the cover part 241.

The remaining structures and operations of the eighth embodiment are similar to those of the above-mentioned seventh embodiment.

As described above, according to the seventh and eighth embodiments, a pair of ribs 234 are provided on the neighboring portions of the connecting portions between the cover plates 231, 242 and side walls 232 of the cover parts 230, 241 and are projected therefrom inwardly of the cover parts 230, 241 in such a manner that they extend into the cover plates 231, 242 and side walls 232 along the transverse direction of the cover plates 231, 242 and side walls 232. Also, between the ribs 234, there is interposed a sheet-shaped member 235 composed of a PET film in such a manner that it extends substantially parallel to the cover plates 231, 242 of the cover parts 230, 241 with a given clearance between them.

Therefore, according to the seventh and eighth embodiments, the magnetic tape cassette storage cases 210, 240 are not only simple in structure but also capable of storing a large quantity of information sheets 213 at a given position in a given posture as well as with a good operation efficiency together with the magnetic tape cassette 211. In other words, not only the storability of the magnetic tape cassette 211 and information sheet 213 can be enhanced but also the position accuracy of the information sheet 213 within the magnetic tape cassette storage cases 210, 240 can be enhanced.

Thanks to this, it is possible to prevent occurrence of an inconvenience that, for example, the position-shifted information sheet 213 can be held by and between the side walls 232 of the cover parts 230, 241 and the inner walls 222 of the storage parts 220, 243 to thereby be unable to close the cover parts 230, 241.

Also, since the ribs 234 are disposed so as to extend into the bottom plates 221, 245 and inner walls 222 of the storage parts 220, 243, the rigidity of the whole of the cover parts 230, 241 can be enhanced, thereby being able to prevent the side walls 232 of the cover parts 230, 241 against their deformation such as their falls.

Further, in the magnetic tape cassette storage cases 210, 240 according to the seventh and eighth embodiments, it is not necessary to match the position of the information sheet 213 to the ribs 234. Therefore, storage of the information sheet 213 can be carried out quickly and smoothly to thereby be able to obtain a good operation efficiency.

Next, description will be given below of the third mode for carrying out the invention.

Figure 12:
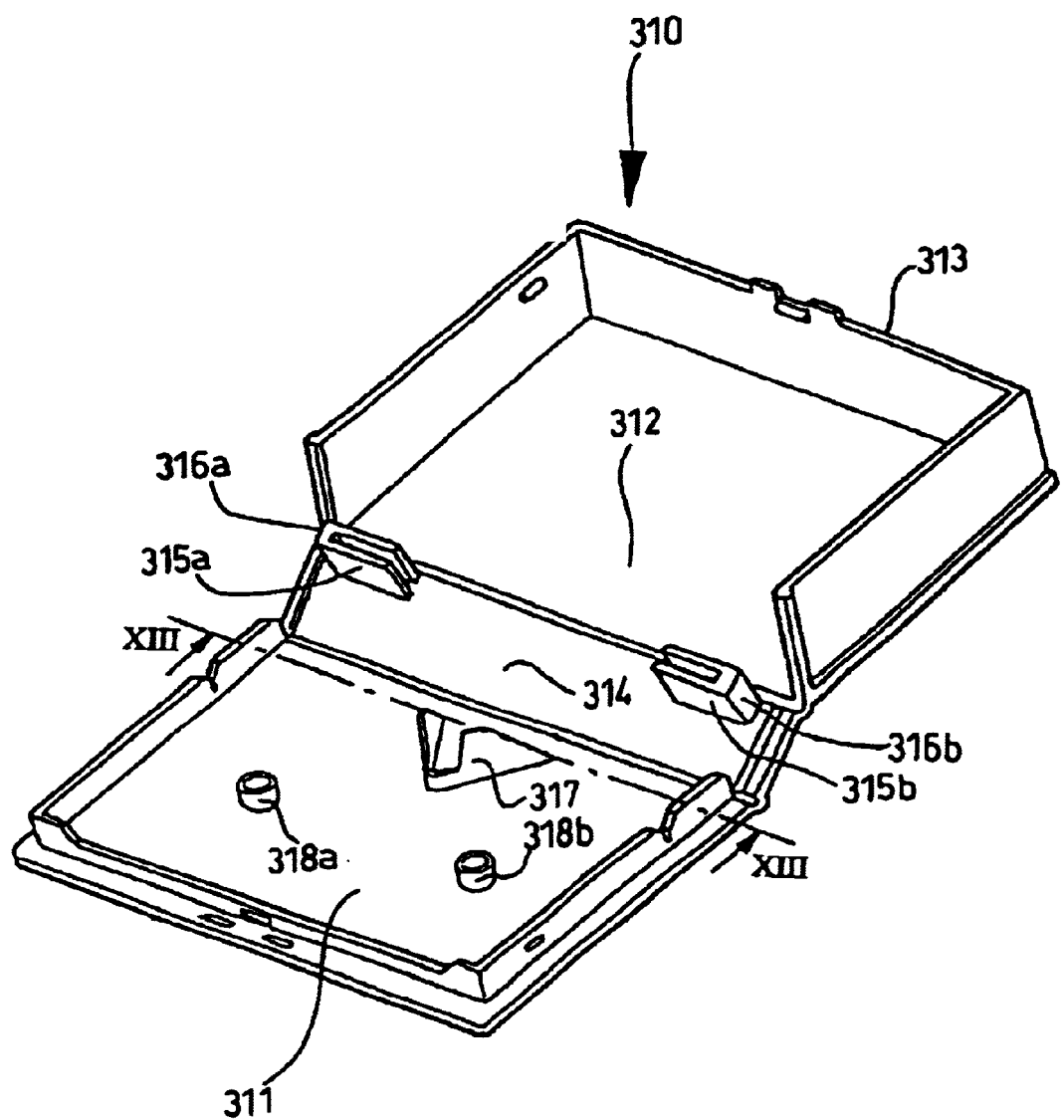
FIG. 12 is a perspective view of a storage case for storing a magnetic tape cassette according to a ninth embodiment belonging to the third mode for carrying out the invention.

Now, FIG. 12 is a perspective view of a storage case for storing a magnetic tape cassette according to a ninth embodiment belonging to the third mode for carrying out the invention, showing the opened state of the present storage case 310. This storage case 310 is an integrated body which is composed of a storage part 311 for storing a magnetic tape cassette therein, a cover part 312 including three outer walls 313, and a hinge part 314 for connecting together the storage part 311 and cover part 312 in such a manner that the cover part 312 can be opened and closed. And, the dimension of the hinge part 314 is set such that, when the cover part 312 is closed while the magnetic tape cassette is stored in the storage part 311, between the cover part 312 and magnetic tape cassette, there can be defined a clearance d for storing a sheet bundle therein. Further, within the range of the clearance d and near to the two end portions of the hinge part 314, there are disposed two U-shaped ribs 315a, 315b which are capable of holding the sheet bundle between them due to their mutually opposed surfaces. By the way, a V-shaped rib 317 for securing the opening portion of the back surface of the magnetic tape cassette and reel securing ribs 318a, 318b for securing the reel hub of the magnetic tape cassette may be omitted. However, from the viewpoints of prevention of the rickety motion of the magnetic tape cassette in the height direction thereof as well as prevention of the shifting motion thereof in the transverse direction thereof, preferably, they may be disposed.

Next, description will be given below of the operation of the ninth embodiment.

When a user holds or sandwiches the sheet bundle, since the portions for holding or sandwiching the sheet bundle, that is, the ribs 315a, 315b are disposed in the hinge part 314, the operation for holding or sandwiching the sheet bundle can be simplified to a great extent. That is, when the storage case 310 is opened, the openings of the ribs 315a, 315b are made to face upward, which makes it very easy to hold or sandwich the sheet bundle.

Figure 13:
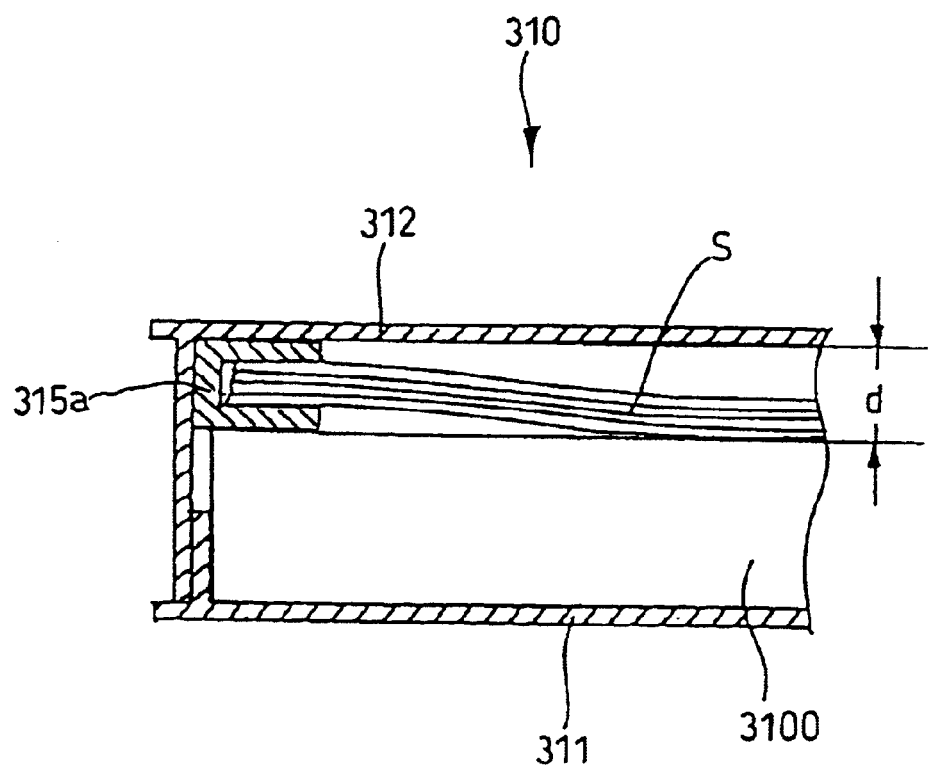
FIG. 13 is a section view taken along the line XIII—XIII shown in FIG. 12.

Referring here to FIG. 13, in FIG. 13, there is shown a state where a magnetic tape cassette 3100 is stored within the storage case 310 and the cover part 312 is closed. However, FIG. 13 is a section view of the storage case 310 shown in FIG. 12, taken along the line A—A shown in FIG. 12. As can be clearly seen from FIG. 13, the ribs 315a, 315b hold a sheet bundle S between them to thereby retain the sheet bundle S to be stored in the clearance d. As a result of this, there can be eliminated a fear that, when the cover part 312 is opened, the sheet bundle S can fly out therefrom; and, a fear that, when the sheet bundle S is stored, it can be unstable in position and thus the end portion(s) of the sheet(s) can be folded or can be pushed out from the storage case, thereby being unable to lock the storage case in a perfectly closed state.

Also, in the storage case 310, the ribs 315a, 315b may also have a function to prevent the rickety motion of the magnetic tape cassette 3100. Although description will be given below of tenth to fifteenth embodiments according to the invention, ribs employed in the tenth to fifteenth embodiments, similarly to the ribs according to the ninth embodiment, may also have such cassette rickety motion preventive function.

The molding method, according to which the storage case having the above-mentioned structure is molded, is advantageous in the following points. The storage case 310, normally, is formed in an opened state according to an injection molding method using a molding metal mold and, therefore, in case where the mutually opposed surfaces, that is, the ribs 315a, 315b are disposed in the hinge part 314 as in the third mode for carrying out the invention, an undercut can be avoided, which makes it possible to simplify the structure of the metal mold further.

Figure 14:
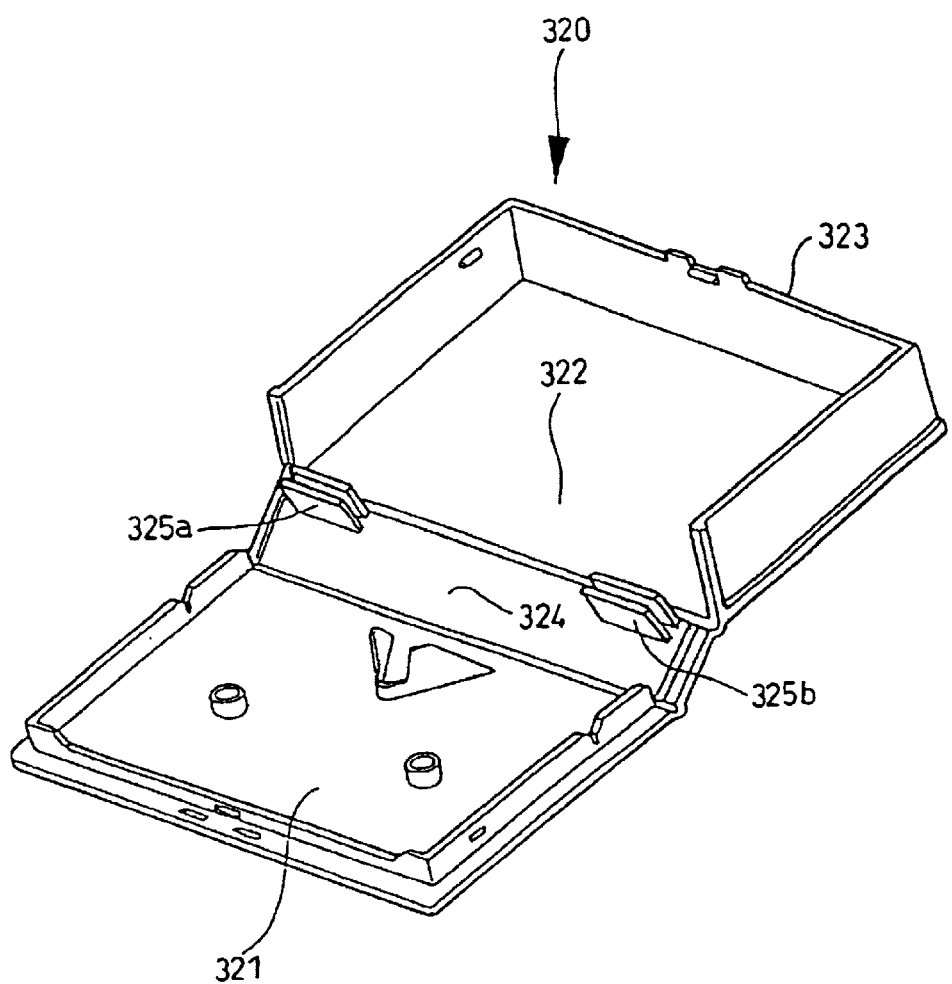
FIG. 14 is a perspective view of a storage case for storing a magnetic tape cassette according to a tenth embodiment belonging to the third mode for carrying out the invention.

Now, FIG. 14 shows a storage case 320 according to a tenth embodiment belonging to the third mode for carrying out the invention. This storage case 320 is an integrated body which is mainly composed of a storage part 321 for storing a magnetic tape cassette therein, a cover part 322 including three outer walls 323 for enclosing the storage part 321, and a hinge part 324 for connecting together the storage part 321 and cover part 322 in such a manner that the cover part 312 can be opened and closed. And, the dimension of the hinge part 324 is set such that, when the cover part 322 is closed while the magnetic tape cassette is stored in the storage part 321, between the cover part 322 and magnetic tape cassette, there can be defined a clearance for storing a sheet bundle therein. Further, within the range of the clearance and near to the two end portions of the hinge part 324, there are disposed two ribs 325a, 325b respectively having mutually opposed surfaces which are capable of holding the sheet bundle between them.

Differently from the previously-mentioned ribs 315a, 315b of a closed type used in the storage case 310, that is, a type (see FIG. 2) that the portions 316a, 316b of the hinge part 314, which are respectively situated on the outside in the longitudinal direction of the hinge part 314, are closed, the ribs 325a, 325b according to the tenth embodiment are of an opened type. In the case of the present structure, when a sheet bundle is inserted, the sheet bundle can be inserted not only from a direction perpendicular to the hinge part but also from a direction parallel to the hinge part. Further, the tenth embodiment has substantially similar operation effects to the above-mentioned ninth embodiment.

Figure 15:
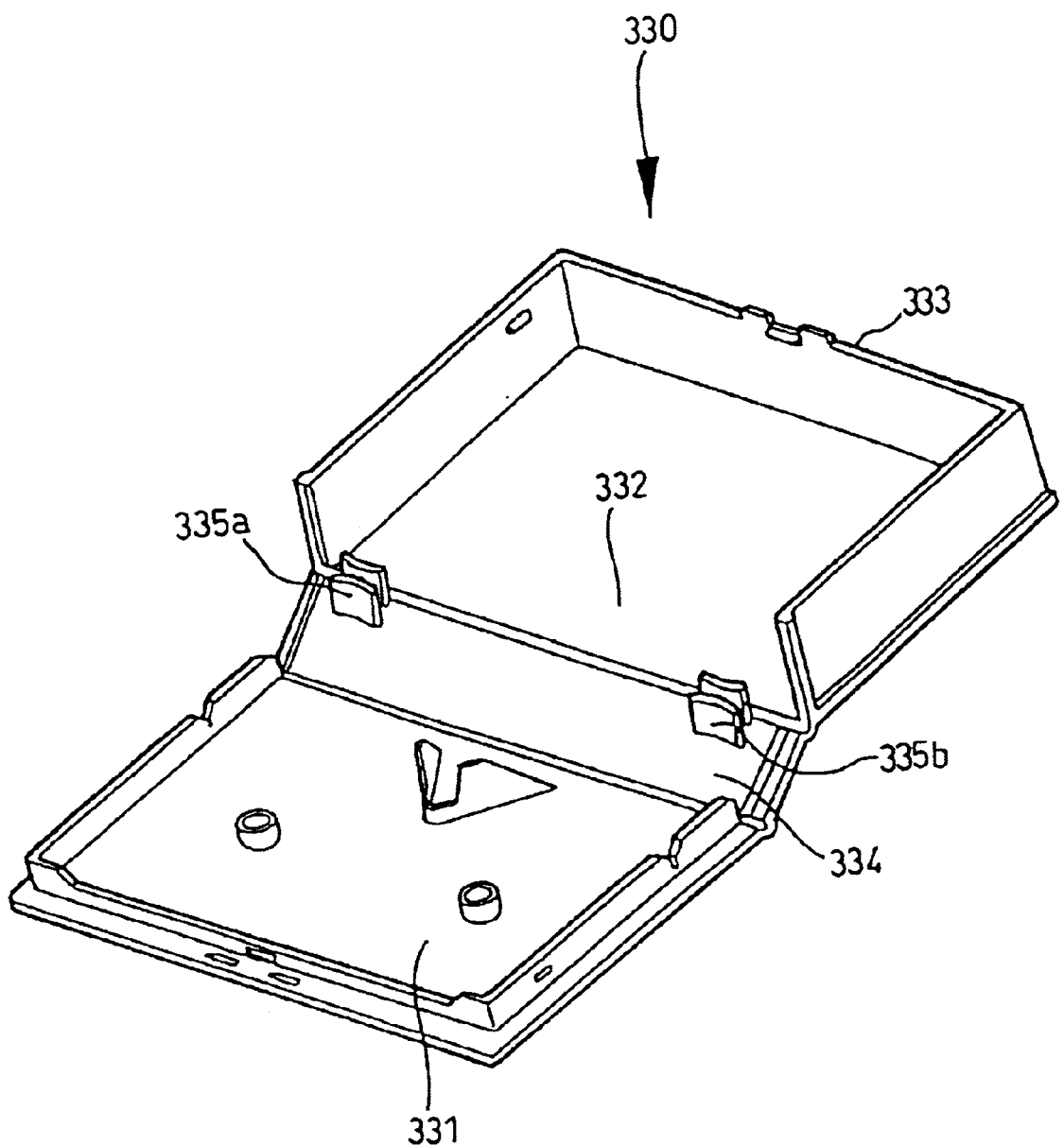
FIG. 15 is a perspective view of a storage case for storing a magnetic tape cassette according to an eleventh embodiment belonging to the third mode for carrying out the invention.

Now, FIG. 15 shows a storage case 330 according to an eleventh embodiment belonging to the third mode for carrying out the invention. This storage case 330 is an integrated body which is mainly composed of a storage part 331 for storing a magnetic tape cassette therein, a cover part 332 including three outer walls 333 for enclosing the storage part 331, and a hinge part 334 for connecting together the storage part 331 and cover part 332 in such a manner that the cover part 332 can be opened and closed. And, the dimension of the hinge part 334 is set such that, when the cover part 332 is closed while the magnetic tape cassette is stored in the storage part 331, between the cover part 332 and magnetic tape cassette, there can be defined a clearance for storing a sheet bundle therein. Further, within the clearance and near to the two end portions of the hinge part 334, there are disposed two ribs 335a, 335b respectively having mutually opposed surfaces which are capable of holding the sheet bundle between them.

The ribs 335a, 335b, similarly to the above-mentioned ribs 325a, 325b of the storage case 320, are of an opened type that the portions thereof situated on the outside in the longitudinal direction thereof are opened. Also, the present ribs are disposed such that the clearances of the central portions thereof is set smaller than the clearances of the two opened portions thereof. In the storage case 330, not only the ribs 335a, 335b have similar operations to the ribs 325a, 325b of the storage case 320 but also, for example, by flexing the present ribs using the elastic forces of the central portions thereof, the method for storing the sheet bundle is allowed to have flexibility. Further, the eleventh embodiment has also substantially similar operation effects to the ninth embodiment.

Figure 16:
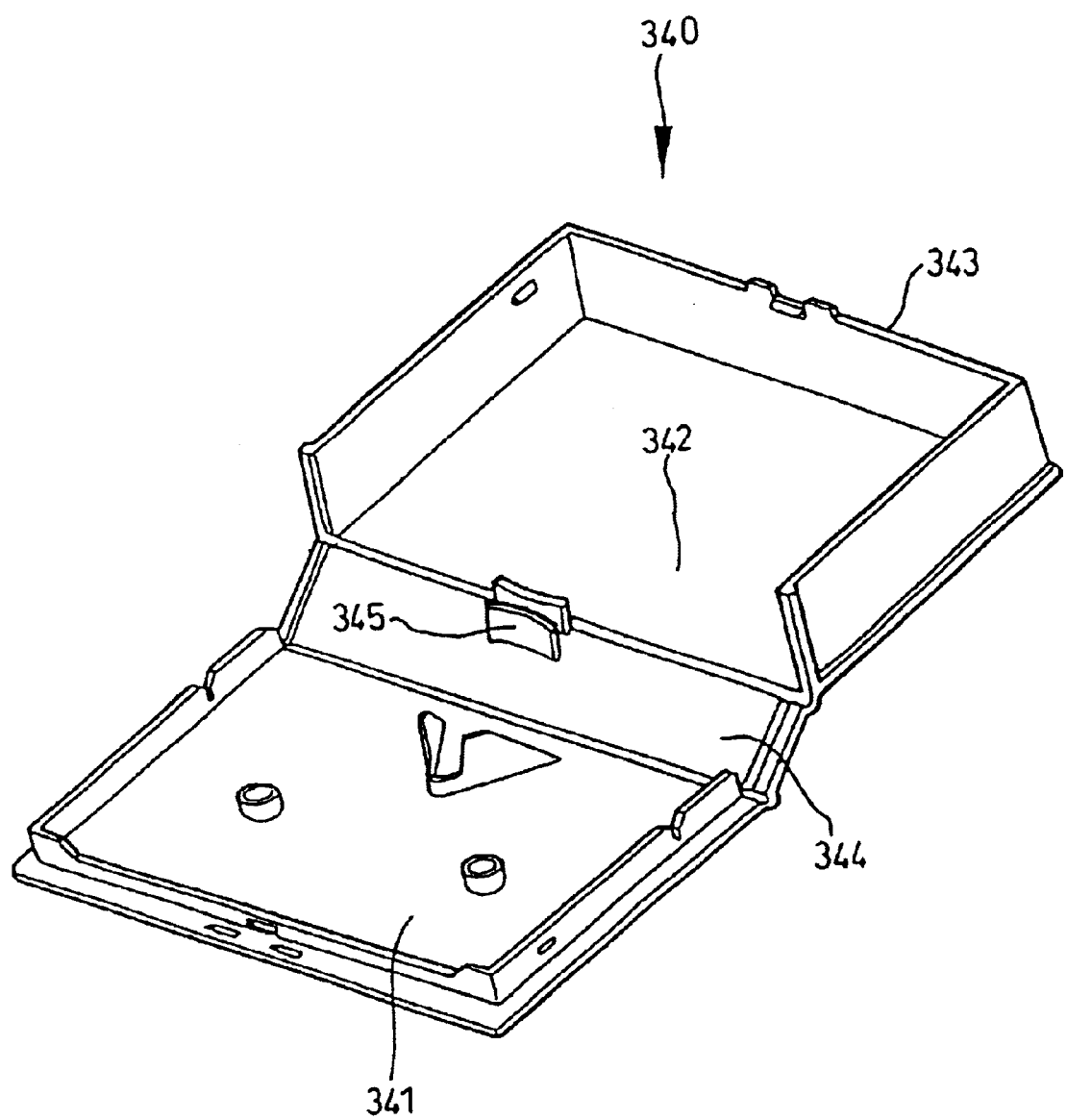
FIG. 16 is a perspective view of a storage case for storing a magnetic tape cassette according to a twelfth embodiment belonging to the third mode for carrying out the invention.

Now, FIG. 16 shows a storage case 340 according to a twelfth embodiment belonging to the third mode for carrying out the invention. This storage case 340 is an integrated body which is mainly composed of a storage part 341 for storing a magnetic tape cassette therein, a cover part 342 including three outer walls 343 for enclosing the storage part 341, and a hinge part 344 for connecting together the storage part 341 and cover part 342 in such a manner that the cover part 342 can be opened and closed. And, the dimension of the hinge part 344 is set such that, when the cover part 342 is closed while the magnetic tape cassette is stored in the storage part 341, between the cover part 342 and magnetic tape cassette, there can be defined a clearance for storing a sheet bundle therein. Further, within the range of the above-mentioned clearance and in the central portion of the hinge part 344, there is disposed a rib 345 which is capable of holding or sandwiching the sheet bundle through its mutually opposed surfaces. This rib 345 consists of a single rib disposed in the central portion of the hinge part 344; and, therefore, not only the present storage case is advantageous in the manufacturing cost thereof but also a user is able to insert the sheet bundle relatively easily. Further, the twelfth embodiment has also substantially similar operation effects to the ninth embodiment. By the way, the rib 345 of the twelfth embodiment may also have the same shape as the ribs 325a, 325b of the tenth embodiment.

Figure 17:
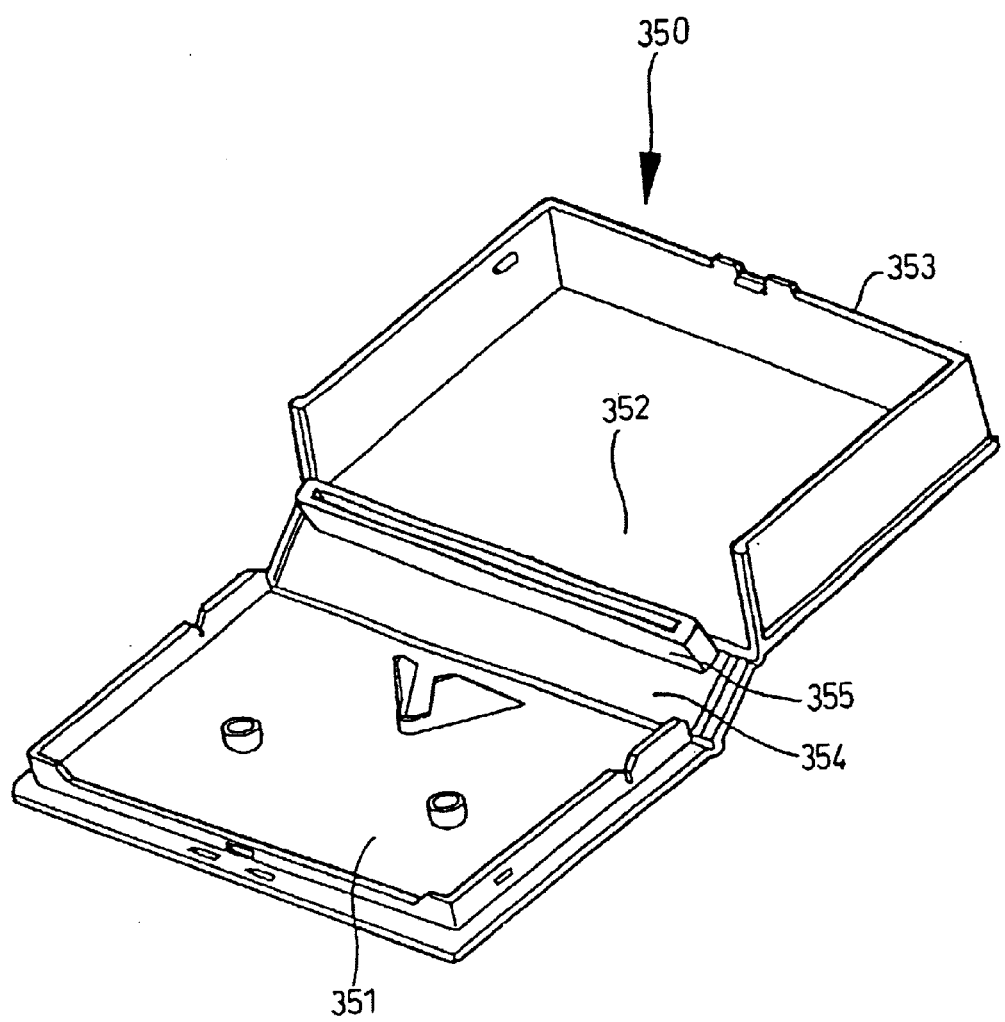
FIG. 17 is a perspective view of a storage case for storing a magnetic tape cassette according to a thirteenth embodiment belonging to the third mode for carrying out the invention.

Now, FIG. 17 shows a storage case 350 according to a thirteenth embodiment belonging to the third mode for carrying out the invention. This storage case 350 is an integrated body which is mainly composed of a storage part 351 for storing a magnetic tape cassette therein, a cover part 352 including three outer walls 353 for enclosing the storage part 351, and a hinge part 354 for connecting together the storage part 351 and cover part 352 in such a manner that the cover part 352 can be opened and closed. And, the dimension of the hinge part 354 is set such that, when the cover part 352 is closed while the magnetic tape cassette is stored in the storage part 351, between the cover part 352 and magnetic tape cassette, there can be defined a clearance for storing a sheet bundle therein. Further, a rib 355, which has mutually opposed surfaces capable of holding or sandwiching the sheet bundle between them, is disposed in the above-mentioned clearance and almost over the entire areas of the hinge part 354 in the longitudinal direction thereof. The present rib 355 has a wider area capable of holding or sandwiching the sheet bundle and, therefore, it has a relatively larger holding force. Further, the thirteenth embodiment has also substantially similar operation effects to the ninth embodiment.

Figure 18:
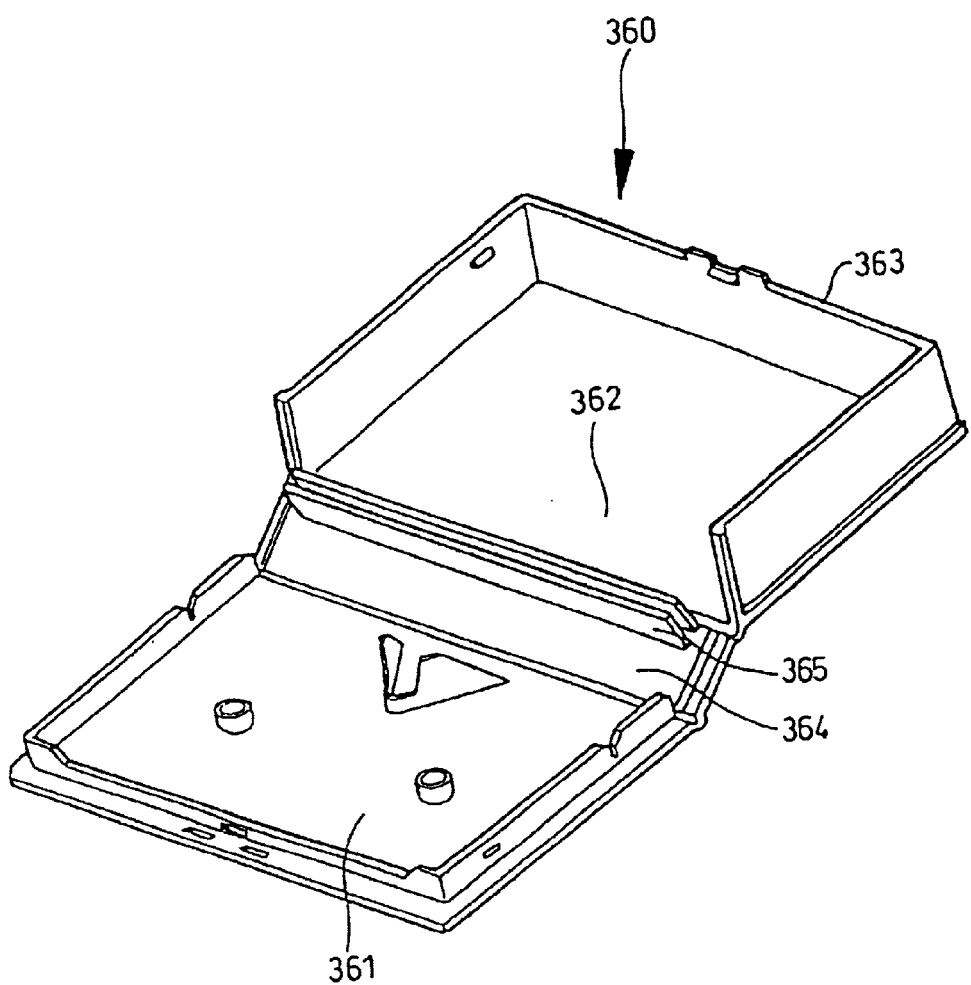
FIG. 18 is a perspective view of a storage case for storing a magnetic tape cassette according to a fourteenth embodiment belonging to the third mode for carrying out the invention.

Now, FIG. 18 shows a storage case 360 according to a fourteenth embodiment belonging to the third mode for carrying out the invention. This storage case 360 is an integrated body which is mainly composed of a storage part 361 for storing a magnetic tape cassette therein, a cover part 362 including three outer walls 363 for enclosing the storage part 361, and a hinge part 364 for connecting together the storage part 361 and cover part 362 in such a manner that the cover part 362 can be opened and closed. And, the dimension of the hinge part 364 is set such that, when the cover part 362 is closed while the magnetic tape cassette is stored in the storage part 361, between the cover part 362 and magnetic tape cassette, there can be defined a clearance for storing a sheet bundle therein. Further, a rib 365, which is composed of two plate-shaped members having mutually opposed and parallel surfaces capable of holding a sheet bundle between them, is disposed in the range of the above-mentioned clearance and almost over the entire areas of the hinge part 364 in the longitudinal direction thereof. The rib 365 has a substantially similar operation to both of the ribs 325a, 325b of the storage case 320 and the rib 355 of the storage case 350. Further, the fourteenth embodiment has also substantially similar operation effects to the ninth embodiment.

Figure 19:
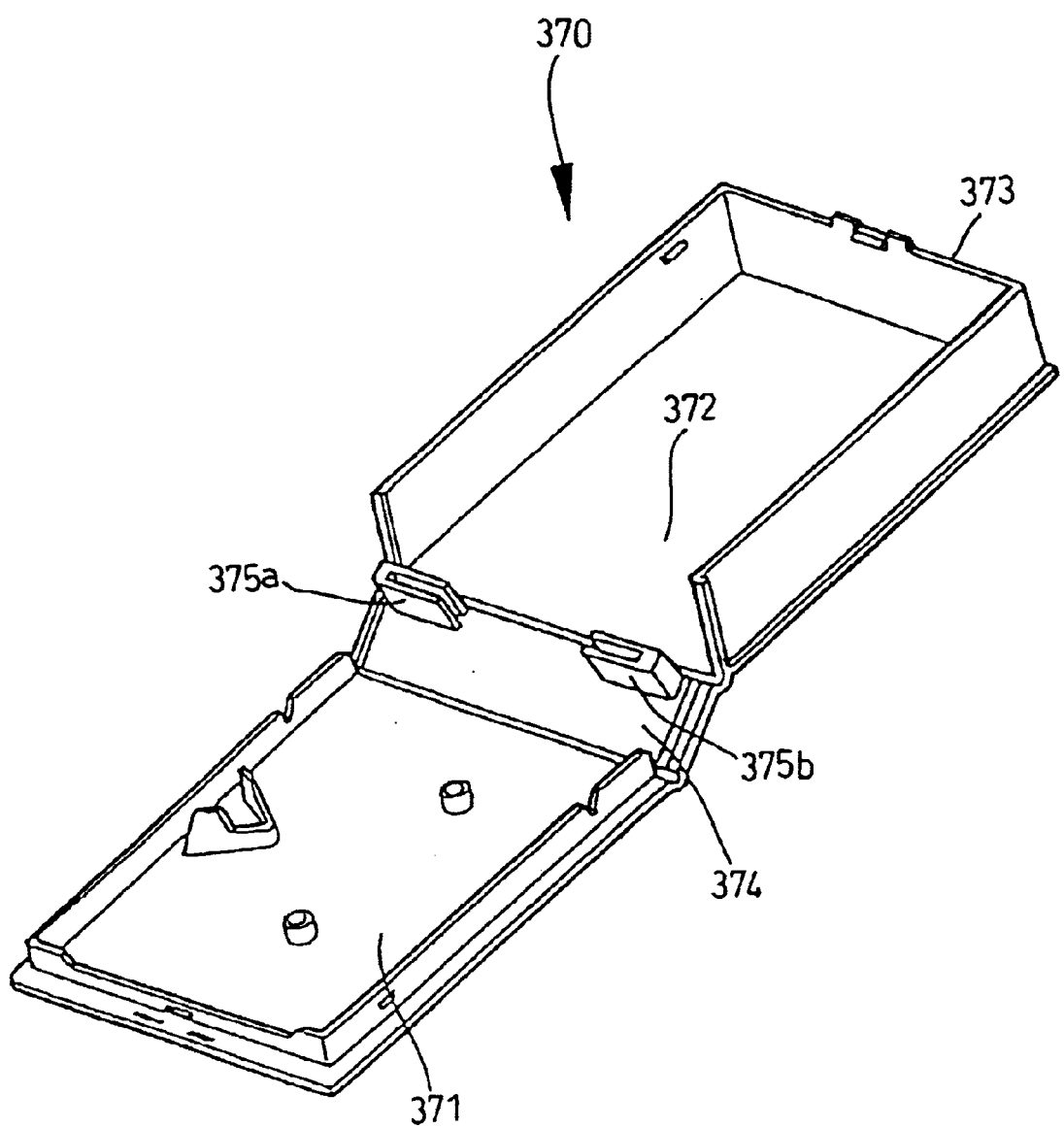
FIG. 19 is a perspective view of a storage case for storing a magnetic tape cassette according to a fifteenth embodiment belonging to the third mode for carrying out the invention.

Now, FIG. 19 shows a storage case 360 according to a fifteenth embodiment belonging to the third mode for carrying out the invention. This storage case 370 is an integrated body which is mainly composed of a storage part 371 for storing a magnetic tape cassette therein, a cover part 372 including three outer walls 373 for enclosing the storage part 371, and a hinge part 374 for connecting together the storage part 371 and cover part 372 in such a manner that the cover part 372 can be opened and closed. And, the dimension of the hinge part 374 is set such that, when the cover part 372 is closed while the magnetic tape cassette is stored in the storage part 371, between the cover part 372 and magnetic tape cassette, there can be defined a clearance for storing a sheet bundle therein. Further, two U-shaped ribs 375a, 375b, which are capable of holding a sheet bundle using the mutually opposed surfaces thereof, are respectively disposed in the above-mentioned clearance and near to the end portion of the hinge part 374. The ribs 375a, 375b have substantially similar operation effects to the ribs 315a, 315b according to the ninth embodiment.

As can be seen clearly from comparison of the fifteenth embodiment with the ninth to fourteenth embodiments, as a method for storing the magnetic tape cassette, the fifteenth embodiment employs a different storing method (storing direction) from the storing method employed in the ninth to fourteenth embodiments. However, in enforcing the present invention, any of the storing methods may be employed. Also, as the kinds of the ribs, there may also be used the kinds of the ribs that are employed in the ninth to fourteenth embodiments. Further, the shape of the rib for holding the sheet bundle is also not limited to the above-mentioned embodiments but it can also be changed variously according to the states of use.

Although description has been given heretofore of the preferred embodiments of the invention, the invention is not limited to these embodiments but can be changed and improved properly. For example, the structures of the illustrated embodiments may be combined together properly. Also, the invention can also apply to a storage case for a magnetic tape cassette other than the DVC.

INDUSTRIAL APPLICABILITY

According to the first invention, at least a pair of ribs, which are projectingly provided on the neighboring portions of the connecting portions between the bottom plate and inner walls of the storage part or on the neighboring portions of the connecting portions between the cover plate and outer walls of the cover part, define, between the back or front surface of the magnetic tape cassette and the bottom plate of the storage part or the cover plate of the cover part, a required clearance capable of storing the information sheet therein.

Thanks to this, the present storage case is not only simple in structure but also capable of storing, together with the magnetic tape cassette, a large quantity of information sheets at a given position in a given posture as well as with a good operation efficiency.

The above-mentioned ribs for defining a clearance capable of storing the information sheet therein are formed simple in shape and provides no undercut and, therefore, the structure of a metal mold for molding the same can be made simple.

Also, according to the second invention, the sheet-shaped member is disposed substantially parallel to the cover plate of the cover part with a given space between them, with the end portion thereof fixed to the ribs, thereby defining between the cover plate of the cover part and itself a clearance capable of storing the information sheet therein. Thanks to this, the storage case according to the present mode is not only simple in structure but also capable of storing, together with the magnetic tape cassette, a large quantity of information sheets at a given position in a given posture as well as with a good operation efficiency.

Further, according to the third invention, the magnetic tape cassette storage case is structured as follows: that is, the dimension of the hinge part is set such that, when the cover part is closed while the magnetic tape is stored in the storage case, between the present cover part and magnetic tape cassette, there can be defined a clearance capable of storing a sheet bundle therein; and, in the range of the above-mentioned clearance and on the hinge part, there are disposed one or more ribs each having mutually opposed surfaces. Thanks to the present rib(s), not only a large quantity of sheets can be stored and held but also the position-shifting of the sheet bundle within the storage case and the jumping of the sheet bundle out of the storage case can be prevented.

What is claimed is:

1. A storage case for storing a magnetic tape cassette, comprising:
   a storage part comprising:
      a bottom plate that is opposed to a back or front surface of the magnetic tape cassette, and
      inner walls disposed erect on edge portions of the bottom plate for enclosing the side surfaces of the magnetic tape cassette; and
   a cover part openably and closably connected to said storage part through a hinge part, said cover part comprising:
      outer walls for enclosing said inner walls of said storage part, and
      a cover plate with said outer walls disposed erect thereon,
   wherein on at least one of a connecting portion between said bottom plate and said inner walls of said storage part and a connecting portion between said cover plate and said outer walls of said cover part, there are provided at least one pair of ribs so as to project inwardly of said storage part or said cover part, and
   wherein said ribs define, between the back surface or front surface of said magnetic tape cassette and said bottom plate of said storage part or said cover plate of said cover part, a predetermined clearance capable of storing an information sheet therein.

2. The storage case for storing a magnetic tape cassette as set forth in claim 1, wherein said ribs are disposed substantially over an entire area of said connecting portion.

3. The storage case for storing a magnetic tape cassette as set forth in claim 1 or 2, wherein said storage part and said cover part are structured such that the longitudinal side of said bottom plate of said storage part and the longitudinal side of said cover plate of said cover part are connected to said hinge part.

4. The storage case for storing a magnetic tape cassette as set forth in claim 1 or 2, wherein said storage part and said cover part are structured such that the transverse side of said bottom plate of said storage part and the transverse side of said cover plate of said cover part are connected to said hinge part.

5. A storage case for storing a magnetic tape cassette, comprising:
   a storage part capable of storing said magnetic tape cassette therein; and
   a cover part including a cover plate opposed to a front or back surface of said magnetic tape cassette stored in said storage part and side walls disposed erect on the edge portion of said cover plate, and connected openably and closably to said storage part through a hinge part,
   wherein a pair of ribs are provided on connecting portions of said cover plate and said side walls of said cover part so as to project inwardly of said cover part; and,
   a sheet-shaped member disposed substantially parallel to said cover plate of said cover part with a given distance between them, said sheet-shaped member having two end portions that are fixed to said ribs, said sheet-shaped member defining, between said cover plate of said cover part and itself, a predetermined clearance capable of storing an information sheet therein.

6. The storage case for storing a magnetic tape cassette as set forth in claim 5, wherein said ribs are respectively structured in such a shape that, when said magnetic tape cassette is stored, said ribs are operable to press against said magnetic tape cassette to said storage part side.

7. The storage case for storing a magnetic tape cassette as set forth in claim 5 or 6, wherein said storage part and said cover part are structured such that the longitudinal sides of said bottom plate of said storage part and said cover plate of said cover part are connected to said hinge part.

8. The storage case for storing a magnetic tape cassette as set forth in claim 5 or 6, wherein said storage part and said cover part are structured such that the transverse sides of said bottom plate of said storage part and said cover plate of said cover part are connected to said hinge part.

9. A storage case in combination with a magnetic tape cassette, the combination comprising:

a storage part operative to store said magnetic tape cassette therein;

a cover part including outer walls for enclosing said storage part; and, a hinge part for connecting together said storage part and said cover part in an openable and closable manner, wherein the dimension of said hinge part is set such that, when said cover part is closed while said magnetic tape cassette is stored, between said cover part and said magnetic tape cassette, there is defined a clearance operative to store a sheet bundle therein; and, in the range of said clearance and on said hinge part, there are disposed one or more ribs each including mutually opposed surfaces.

10. The storage case in combination with a magnetic tape cassette as set forth in claim 9, wherein said ribs comprise a pair of ribs each having a U-shaped section and said pair of ribs are disposed near to the end portions of said hinge part in such a manner that they respectively have U-shaped openings opposed to each other.

11. The storage case in combination with a magnetic tape cassette as set forth in claim 9, wherein said ribs comprise a pair of ribs each having two parallel flat plates and said pair of ribs are disposed near to the end portions of said hinge part.

12. The storage case in combination with a magnetic tape cassette as set forth in claim 9, wherein said ribs comprises a pair of ribs each having two parallel flat plates having mutually opposed, convexly curved surfaces and said pair of ribs are disposed near to the end portions of said hinge part.

13. The storage case in combination with a magnetic tape cassette as set forth in claim 9, wherein said rib comprises a rib having two parallel flat plates having mutually opposed, convexly curved surfaces and said rib is disposed in the central portion of said hinge part.

14. The storage case in combination with a magnetic tape cassette as set forth in claim 9, wherein said rib comprises a rib having a rectangular section and said rib is disposed substantially over an entire area of said hinge part.

15. The storage case in combination with a magnetic tape cassette as set forth in claim 9, wherein said rib comprises a rib having two parallel flat plates and said rib is disposed substantially over an entire area of said hinge part.

16. The storage case in combination with a magnetic tape cassette as set forth in any one of claims 9 to 15, wherein said storage part and said cover part are structured such that the longitudinal sides of a bottom plate of said storage part and a cover plate of said cover part are connected to said hinge part.

17. The storage case in combination with a magnetic tape cassette as set forth in any one of claims 9 to 15, wherein said storage part and said cover part are structured such that the transverse sides of a bottom plate of said storage part and a cover plate of said cover part are connected to said hinge part.

18. A storage case for storing a magnetic tape cassette consisting of an integral body comprising:

a storage part operative to store the magnetic tape cassette therein;

a cover part including outer walls for enclosing said storage part; and, a hinge part for connecting together said storage part and said cover part in an openable and closable manner, wherein the dimension of said hinge part is greater than a thickness of said magnetic tape cassette for defining a clearance between said cover part and said magnetic tape cassette, such to store a sheet bundle therein;

wherein one or more ribs are disposed on said hinge part in a range of the clearance, said one or more ribs each including mutually opposed surfaces; and wherein said ribs have convexly curved surfaces and are disposed in the central portion of said hinge part.

* * * * *